US011238743B2

(12) United States Patent
Lin et al.

(10) Patent No.: US 11,238,743 B2
(45) Date of Patent: Feb. 1, 2022

(54) TRAFFIC INFORMATION PROCESSING METHOD AND APPARATUS

(71) Applicant: Huawei Technologies Co., Ltd., Shenzhen (CN)

(72) Inventors: Yangbo Lin, Shenzhen (CN); Hui Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 106 days.

(21) Appl. No.: 16/824,229

(22) Filed: Mar. 19, 2020

(65) Prior Publication Data
US 2020/0219404 A1 Jul. 9, 2020

Related U.S. Application Data

(63) Continuation of application No. PCT/CN2018/102142, filed on Aug. 24, 2018.

(30) Foreign Application Priority Data

Sep. 20, 2017 (CN) .......................... 201710851297.6

(51) Int. Cl.
G08G 5/00 (2006.01)
G08G 1/01 (2006.01)
G08G 1/0965 (2006.01)

(52) U.S. Cl.
CPC ......... *G08G 5/0013* (2013.01); *G08G 1/0116* (2013.01); *G08G 1/0133* (2013.01); *G08G 1/0145* (2013.01); *G08G 1/0965* (2013.01)

(58) Field of Classification Search
CPC .. G08G 5/0013; G08G 1/0133; G08G 1/0145; G08G 1/0116; G08G 1/0141; G08G 1/096725
See application file for complete search history.

(56) References Cited

U.S. PATENT DOCUMENTS 9,685,077 B2 * 6/2017 Schlienz ............... H04W 4/024
10,403,135 B2 * 9/2019 Rosales ................ G08G 1/0141
10,692,365 B2 * 6/2020 Ran ........................ G08G 1/167
10,872,527 B2 * 12/2020 Rosales ............ G08G 1/096783
11,024,164 B2 * 6/2021 Lin ......................... H04W 4/40
(Continued)

FOREIGN PATENT DOCUMENTS

CN           1272663 A      11/2000
CN         101594579 A      12/2009
(Continued)

Primary Examiner — Luis A Martinez Borrero
(74) Attorney, Agent, or Firm — Conley Rose, P.C.

(57) ABSTRACT

A traffic information processing method includes obtaining, by a first traffic control unit, a traffic application type and first traffic information of a traffic target object, determining an interaction coverage area based on the traffic application type and the first traffic information of the traffic target object, determining, by the first traffic control unit, a second traffic control unit based on the interaction coverage area and a management area of a traffic control unit known to the first traffic control unit, and sending the first traffic information of the traffic target object to the second traffic control unit, where there is an overlapping area between a management area of the second traffic control unit and the interaction coverage area.

20 Claims, 13 Drawing Sheets

(56) References Cited

U.S. PATENT DOCUMENTS

| | | | |
|---|---|---|---|
| 11,057,909 B2* | 7/2021 | Boban | H04W 72/1252 |
| 11,070,988 B2* | 7/2021 | Rosales | G08G 1/0116 |
| 11,080,999 B2* | 8/2021 | Lin | G08G 1/093 |
| 2004/0091134 A1 | 5/2004 | Long | |
| 2005/0221759 A1* | 10/2005 | Spadafora | G08G 1/09 455/41.2 |
| 2011/0317780 A1* | 12/2011 | Kang | H04L 5/0053 375/260 |
| 2014/0295827 A1* | 10/2014 | Tesanovic | H04W 36/0061 455/426.1 |
| 2015/0310738 A1* | 10/2015 | Karacan | G08G 1/096741 701/117 |
| 2016/0155327 A1* | 6/2016 | Schlienz | G08G 1/07 340/907 |
| 2016/0212745 A1* | 7/2016 | Hiertz | H04W 16/32 |
| 2016/0374105 A1* | 12/2016 | Kalhan | H04W 56/001 |
| 2017/0084173 A1 | 3/2017 | Kim et al. | |
| 2018/0049104 A1* | 2/2018 | Van Phan | H04W 76/14 |
| 2019/0043350 A1* | 2/2019 | Rosales | G08G 1/096783 |
| 2019/0045378 A1* | 2/2019 | Rosales | G08G 1/0133 |
| 2019/0304296 A1* | 10/2019 | Basu | G08G 1/096775 |
| 2019/0306677 A1* | 10/2019 | Basu | H04W 4/027 |
| 2019/0364492 A1* | 11/2019 | Azizi | H04W 48/16 |
| 2020/0168081 A1* | 5/2020 | Ran | G08G 1/0145 |
| 2020/0184811 A1* | 6/2020 | Rosales | G08G 1/0141 |
| 2020/0205062 A1* | 6/2020 | Azizi | H04W 68/005 |
| 2020/0211384 A1* | 7/2020 | Lin | G08G 1/0112 |
| 2020/0219387 A1* | 7/2020 | Lin | H04W 4/40 |
| 2021/0118294 A1* | 4/2021 | Ran | G08G 1/096811 |

FOREIGN PATENT DOCUMENTS

| | | |
|---|---|---|
| CN | 101729167 A | 6/2010 |
| CN | 105679061 A | 6/2016 |
| CN | 105872970 A | 8/2016 |
| CN | 106131902 A | 11/2016 |
| CN | 106463052 A | 2/2017 |
| CN | 107862856 A | 3/2018 |

* cited by examiner

Step 700: A first traffic control unit obtains a traffic application type and first traffic information of a traffic target object Step 710: The first traffic control unit determines an interaction coverage area based on the traffic application type and the first traffic information of the traffic target object Step 720: If the first traffic control unit determines that there is an overlapping area between the interaction coverage area and a management area of a traffic control unit other than the first traffic control unit, the first traffic control unit sends the first traffic information of the traffic target object to a second traffic control unit, where the first traffic control unit knows a management area of the first traffic control unit, and the second traffic control unit knows a management area of each traffic control unit

FIG. 7

TRAFFIC INFORMATION PROCESSING METHOD AND APPARATUS

CROSS-REFERENCE TO RELATED APPLICATIONS

This application is a continuation application of International Patent Application No. PCT/CN2018/102142, filed on Aug. 24, 2018, which claims priority to Chinese Patent Application No. 201710851297.6, filed on Sep. 20, 2017, both of which are hereby incorporated by reference in their entireties.

TECHNICAL FIELD

This application relates to the field of wireless communications technologies, and in particular, to a traffic information processing method and apparatus.

BACKGROUND

An intelligent transportation system (ITS) is intended to establish, by integrating and using advanced information technologies, communications technologies, sensing technologies, control technologies, computer technologies, and the like, a real-time, accurate, and highly-efficient comprehensive transportation management system that plays an all-round role in a wide range. The ITS can effectively use transportation facilities, reduce traffic load and environmental pollution, ensure traffic safety, and improve transportation efficiency, is a future development direction of a transportation system, and is also an important part of a smart city.

Currently, in the ITS, to notify information such as a current location, direction, and speed of a vehicle to another related vehicle, the traffic information may be directly broadcast to another surrounding vehicle over a wireless local area network based on a dedicated short range communications (DSRC) technology, or the traffic information may be submitted to a base station over a wireless cellular network based on a long term evolution for vehicle (LTE-V) technology, and then the base station broadcasts the traffic information to another surrounding vehicle over the wireless cellular network.

Receiving objects are not distinguished during the broadcast of the traffic information that is implemented based on the DSRC technology or the LTE-V technology. Therefore, a traffic participant that needs the traffic information may not receive the traffic information, and a traffic participant that does not need the traffic information may receive the unwanted traffic information. Consequently, the traffic information cannot be accurately notified to the traffic participant, and communication resources and processing resources are easily wasted.

SUMMARY

Embodiments of this application provide a traffic information processing method and apparatus, to accurately notify a traffic participant of traffic information.

According to a first aspect, a traffic information processing method is provided, and the method includes obtaining, by a first traffic control unit, a traffic application type and first traffic information of a traffic target object, where the traffic application type is used to indicate a to-be-processed traffic scenario, determining, by the first traffic control unit, an interaction coverage area based on the traffic application type and the first traffic information of the traffic target object, where the interaction coverage area is used to indicate a geographic area related to the to-be-processed traffic scenario, determining, by the first traffic control unit, a second traffic control unit based on the interaction coverage area and a management area of a traffic control unit known to the first traffic control unit, where there is an overlapping area between a management area of the second traffic control unit and the interaction coverage area, and the second traffic control unit is different from the first traffic control unit, and sending, by the first traffic control unit, the first traffic information of the traffic target object to the second traffic control unit.

According to the method provided in this application, traffic information can be accurately notified to a traffic participant, and no communication resources or processing resources are wasted.

In a possible design, the obtaining, by a first traffic control unit, a traffic application type and first traffic information of a traffic target object includes obtaining, by the first traffic control unit, the first traffic information of the traffic target object and the traffic application type based on a preset instruction, or receiving, by the first traffic control unit, the first traffic information of the traffic target object, and determining the traffic application type based on the first traffic information of the traffic target object, or determining, by the first traffic control unit, the first traffic information of the traffic target object and the traffic application type based on a received traffic application request of the traffic target object, where the traffic application request includes the first traffic information of the traffic target object and a request type, and the request type is used to indicate the traffic application type.

Various manners for obtaining the traffic application type and the first traffic information of the traffic target object are provided in this application. These manners are convenient and flexible and may be widely applied to various traffic scenarios.

In a possible design, if determining that a third traffic control unit is different from the second traffic control unit, the first traffic control unit sends the first traffic information of the traffic target object to the second traffic control unit, where the third traffic control unit is a traffic control unit that sends the first traffic information of the traffic target object to the first traffic control unit.

According to the method provided in this application, resource waste caused by repeated notification can be avoided.

In a possible design, after the sending, by the first traffic control unit, the first traffic information of the traffic target object to the second traffic control unit, the method further includes receiving, by the first traffic control unit, a first message sent by the second traffic control unit, where the first message is used to indicate that the second traffic control unit determines to receive the first traffic information of the traffic target object.

According to the method provided in this application, the first traffic control unit can determine that the first traffic information of the traffic target object is accurately notified to the second traffic control unit.

In a possible design, the first traffic control unit is a local traffic control unit or a global traffic control unit, and a management area of the global traffic control unit includes a management area of at least one local traffic control unit.

In a possible design, the first traffic control unit is a local traffic control unit, the first traffic control unit determines the first traffic control unit based on the interaction coverage area and the management area of the traffic control unit known to the first traffic control unit, where there is an overlapping area between a management area of the first traffic control unit and the interaction coverage area, the first traffic control unit determines a traffic participant in the overlapping area between the management area of the first traffic control unit and the interaction coverage area, and the first traffic control unit sends the first traffic information of the traffic target object to the traffic participant, or the first traffic control unit receives second traffic information sent by the traffic participant, and sends the second traffic information to the traffic target object.

According to the method provided in this application, when determining that there is an overlapping area between the management area of the first traffic control unit and the interaction coverage area, the first traffic control unit further determines the traffic participant, and provides interaction support for the traffic participant.

In a possible design, the traffic participant is a communication object in the overlapping area between the management area of the first traffic control unit and the interaction coverage area within a preset time.

According to the method provided in this application, a traffic participant can be accurately determined.

In a possible design, after the first traffic control unit sends the first traffic information of the traffic target object to the traffic participant, the first traffic control unit receives a second message sent by the traffic participant, where the second message is used to indicate that the traffic participant determines to receive the first traffic information of the traffic target object.

According to the method provided in this application, the first traffic control unit can determine that the first traffic information of the traffic target object is accurately notified to the traffic participant.

In a possible design, after the first traffic control unit receives the second traffic information sent by the traffic participant, the first traffic control unit sends a third message to the traffic participant, where the third message is used to indicate that the first traffic control unit determines to receive the second traffic information sent by the traffic participant.

According to the method provided in this application, the traffic participant can determine that the first traffic information of the traffic target object is accurately notified to the first traffic control unit.

According to a second aspect, a traffic information processing method is provided, and the method includes obtaining, by a first traffic control unit, a traffic application type and first traffic information of a traffic target object, where the traffic application type is used to indicate a to-be-processed traffic scenario, determining, by the first traffic control unit, an interaction coverage area based on the traffic application type and the first traffic information of the traffic target object, where the interaction coverage area is used to indicate a geographic area related to the to-be-processed traffic scenario, and if the first traffic control unit determines that there is an overlapping area between the interaction coverage area and a management area of a traffic control unit other than the first traffic control unit, sending, by the first traffic control unit, the first traffic information of the traffic target object to a second traffic control unit, where the first traffic control unit knows a management area of the first traffic control unit, and the second traffic control unit knows a management area of each traffic control unit.

According to the method provided in this application, when knowing only the management area of the first traffic control unit, the first traffic control unit may send the first traffic information of the traffic target object to the second traffic control unit that knows the management area of each traffic control unit such that the second traffic control unit can accurately notify a traffic participant of the traffic information. In this way, no communication resources or processing resources are wasted.

In a possible design, the first traffic control unit is a local traffic control unit, and the second traffic control unit is a global traffic control unit.

In a possible design, the obtaining, by a first traffic control unit, a traffic application type and first traffic information of a traffic target object includes obtaining, by the first traffic control unit, the first traffic information of the traffic target object and the traffic application type based on a preset condition, or receiving, by the first traffic control unit, the first traffic information of the traffic target object, and determining the traffic application type based on the first traffic information of the traffic target object, or determining, by the first traffic control unit, the first traffic information of the traffic target object and the traffic application type based on a received traffic application request of the traffic target object, where the traffic application request includes the first traffic information of the traffic target object and a request type, and the request type is used to indicate the traffic application type.

Various manners for obtaining the traffic application type and the first traffic information of the traffic target object are provided in this application. These manners are convenient and flexible and may be widely applied to various traffic scenarios.

In a possible design, if determining that a third traffic control unit is different from the second traffic control unit, the first traffic control unit sends the first traffic information of the traffic target object to the second traffic control unit, where the third traffic control unit is a traffic control unit that sends the first traffic information of the traffic target object to the first traffic control unit.

According to the method provided in this application, resource waste caused by repeated notification can be avoided.

In a possible design, after the first traffic control unit sends the first traffic information of the traffic target object to the second traffic control unit, the first traffic control unit receives a first message sent by the second traffic control unit, where the first message is used to indicate that the second traffic control unit determines to receive the first traffic information of the traffic target object.

According to the method provided in this application, the first traffic control unit can determine that the first traffic information of the traffic target object is accurately notified to the second traffic control unit.

According to a third aspect, the present disclosure provides a traffic control apparatus, and the apparatus includes a processing unit configured to obtain a traffic application type and first traffic information of a traffic target object, where the traffic application type is used to indicate a to-be-processed traffic scenario, determine an interaction coverage area based on the traffic application type and the first traffic information of the traffic target object, where the interaction coverage area is used to indicate a geographic area related to the to-be-processed traffic scenario, and determine a second traffic control unit based on the interaction coverage area and a management area of a traffic control unit known to a first traffic control unit, where there is an overlapping area between a management area of the second traffic control unit and the interaction coverage area, and the second traffic control unit is different from the first traffic control unit, and a transceiver unit configured to send the first traffic information of the traffic target object to the second traffic control unit.

Optionally, the traffic control apparatus may further implement some or all of the optional implementations of the first aspect.

According to a fourth aspect, the present disclosure provides a traffic control apparatus, and the apparatus includes a processing unit configured to obtain a traffic application type and first traffic information of a traffic target object, where the traffic application type is used to indicate a to-be-processed traffic scenario, and determine an interaction coverage area based on the traffic application type and the first traffic information of the traffic target object, where the interaction coverage area is used to indicate a geographic area related to the to-be-processed traffic scenario, and a transceiver unit configured to if the processing unit determines that there is an overlapping area between the interaction coverage area and a management area of a traffic control unit other than the first traffic control unit, send the first traffic information of the traffic target object to a second traffic control unit, where traffic control apparatus knows a management area of the traffic control apparatus, and the second traffic control unit knows a management area of each traffic control unit.

Optionally, the traffic control apparatus may further implement some or all of the optional implementations of the second aspect.

According to a fifth aspect, the present disclosure provides a traffic control unit. The traffic control unit includes a memory configured to store computer executable program code, a transceiver, and a processor, where the processor is coupled to the memory and the transceiver. The program code stored in the memory includes an instruction. When the processor executes the instruction, the traffic control unit is enabled to perform the method performed by the traffic control unit in the first aspect or the second aspect.

According to a sixth aspect, the present disclosure provides a computer program product. The computer program product includes computer program code, and when the computer program code runs on a computer, the computer is enabled to perform the method according to any one of the possible implementations of the first aspect or any one of the possible implementations of the second aspect.

According to a seventh aspect, the present disclosure provides a computer readable medium. The computer readable medium stores program code, and when the computer program code runs on a computer, the computer is enabled to perform the method according to the implementations of the first aspect or the implementations of the second aspect.

BRIEF DESCRIPTION OF DRAWINGS

FIG. 7 is a second overview flowchart of a traffic information processing method according to this application.

DESCRIPTION OF EMBODIMENTS

The following describes the embodiments of this application with reference to the accompanying drawings.

Development of an ITS is closely related to development of Internet of Things (IoT), presents an IoT process in the transportation industry, and includes collection, processing, release, exchange, analysis, and use of various pieces of information in a transportation system.

Figure 1:
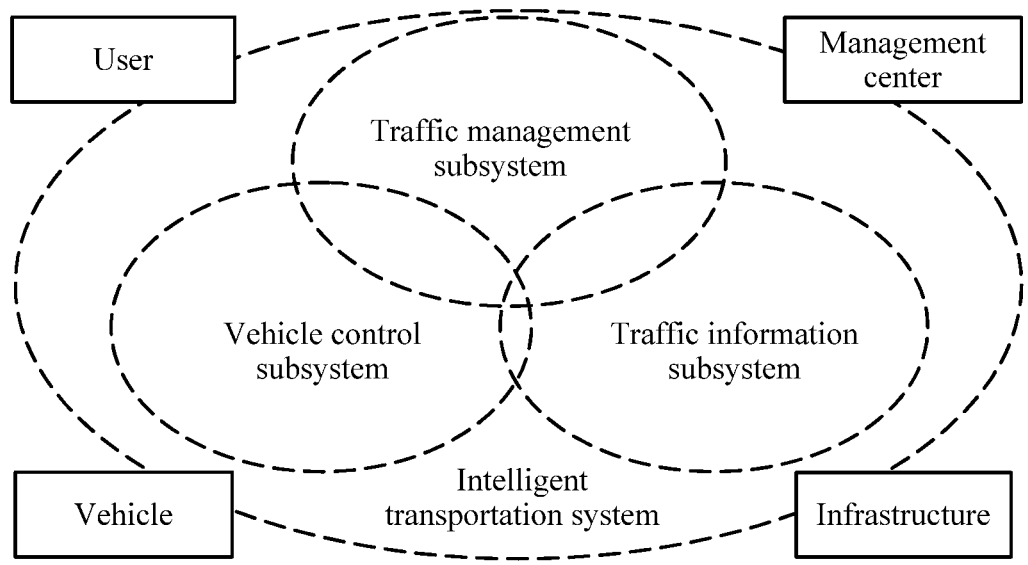
FIG. 1 is a schematic structural diagram of an ITS system according to this application.

As shown in FIG. 1, land transportation is used as an example, and the ITS includes subsystems such as a vehicle control subsystem, a traffic information subsystem, and a traffic management subsystem. The vehicle control subsystem is responsible for safely and efficiently controlling traveling of a vehicle, the traffic information subsystem is responsible for accurately collecting, storing, processing, and exchanging information about a traffic participant in a timely manner, and the traffic management subsystem is responsible for coordinating and controlling an action of a traffic participant based on various aspects of traffic information. Further, the traffic management subsystem may coordinate and control the action of the traffic participant based on a traffic control unit (TCU).

It should be understood that the traffic participant may be roadside infrastructure (for example, a signal light), a means of transport (for example, a vehicle), a pedestrian, a vehicle user, a management center, or the like.

A traffic application/service is a traffic-related function or service provided by the ITS for the traffic participant. A traffic application instance is actual running of the traffic application.

Figure 2:
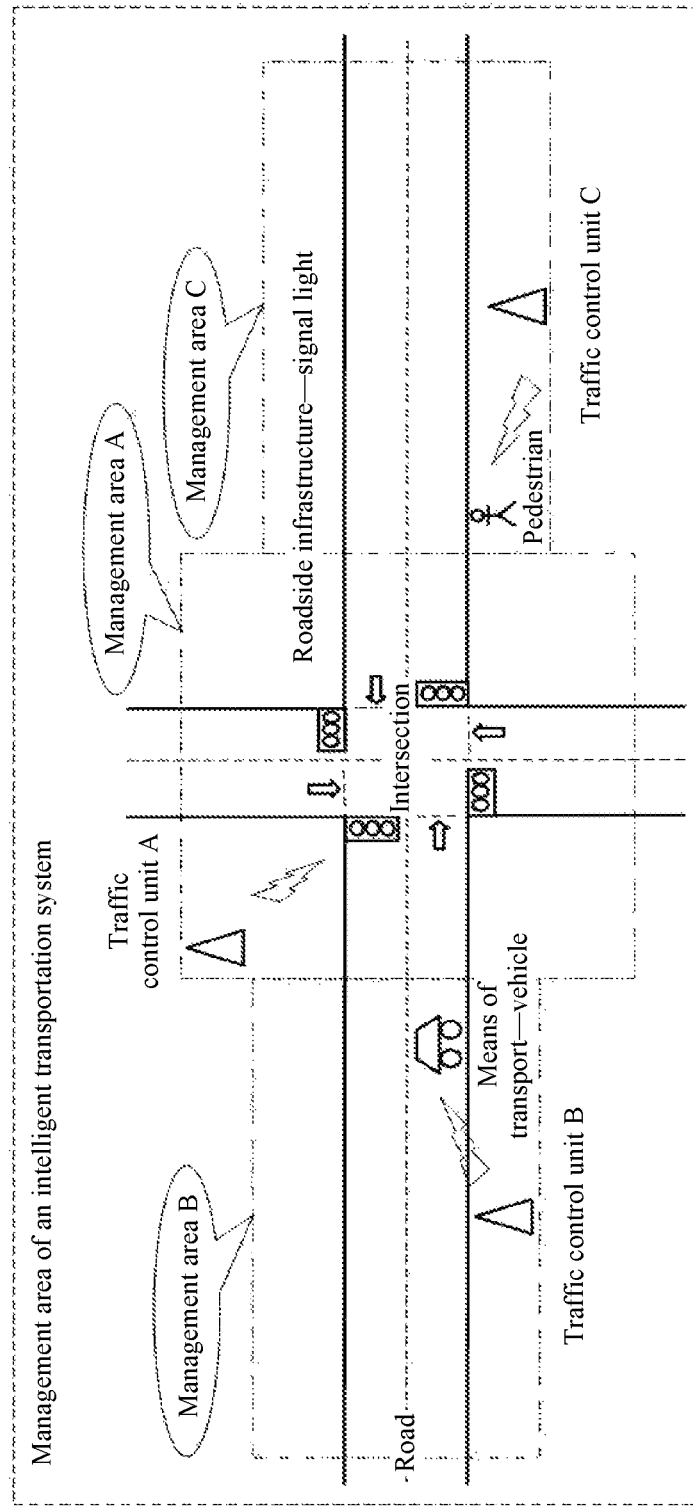
FIG. 2 is a schematic diagram of a specific application scenario according to this application.

A specific application scenario of this application is shown in FIG. 2. A management area of the ITS is divided into a plurality of management areas based on map information, and a TCU is set for each management area. The TCU is responsible for coordinating an action of a traffic participant in a corresponding management area. The TCU may be independently disposed as a functional entity, or may be disposed in combination with a network element of a communications network. For example, the TCU is deployed near a radio base station in the management area for which the TCU is responsible, to more efficiently communicate with a traffic participant coordinated by the TCU.

In FIG. 2, from left to right along a horizontal road, there are three management areas a management area B, a management area A, and a management area C. A TCU A, a TCU B, and a TCU C are respectively responsible for the management area A, the management area B, and the management area C.

In this application, a TCU may include the following two network architectures

First Network Architecture

When a local TCU is deployed or changes, the local TCU notifies another local TCU of an identifier of the local TCU and a management area for which the local TCU is responsible. Therefore, each local TCU knows existence of all local TCUs and management areas of all the local TCUs.

Figure 3:
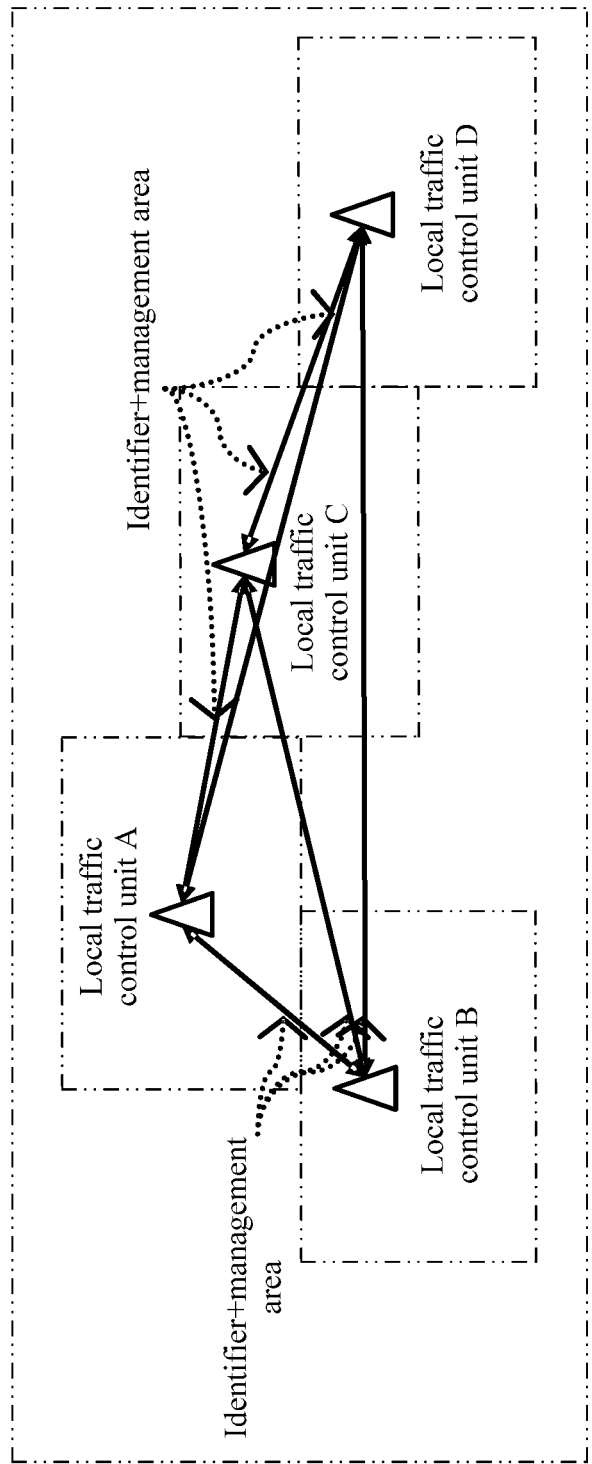
FIG. 3 is a schematic diagram of a first network architecture according to this application.

As shown in FIG. 3, a local TCU A knows a management area of a local TCU B, a management area of a local TCU C, and a management area of a local TCU D. Likewise, the local TCU B knows a management area of the local TCU A, the management area of the local TCU C, and the management area of the local TCU D. The local TCU C knows the management area of the local TCU A, the management area of the local TCU B, and the management area of the local TCU D. The local TCU D knows the management area of the local TCU A, the management area of the local TCU B, and the management area of the local TCU C.

In addition, if a global TCU is deployed, when the local TCU is deployed or changes, the local TCU also needs to notify the global TCU of the identifier and the management area of the local TCU. Therefore, the global TCU knows existence of all the local TCUs and the management areas of all the local TCUs.

Second Network Architecture

When a local TCU is deployed or changes, the local TCU notifies a global TCU of an identifier of the local TCU and a management area for which the local TCU is responsible. Therefore, the global TCU knows existence of all local TCUs and management areas of all the local TCUs while the local TCU does not know existence of all the local TCUs and the management areas of all the local TCUs.

Figure 4:
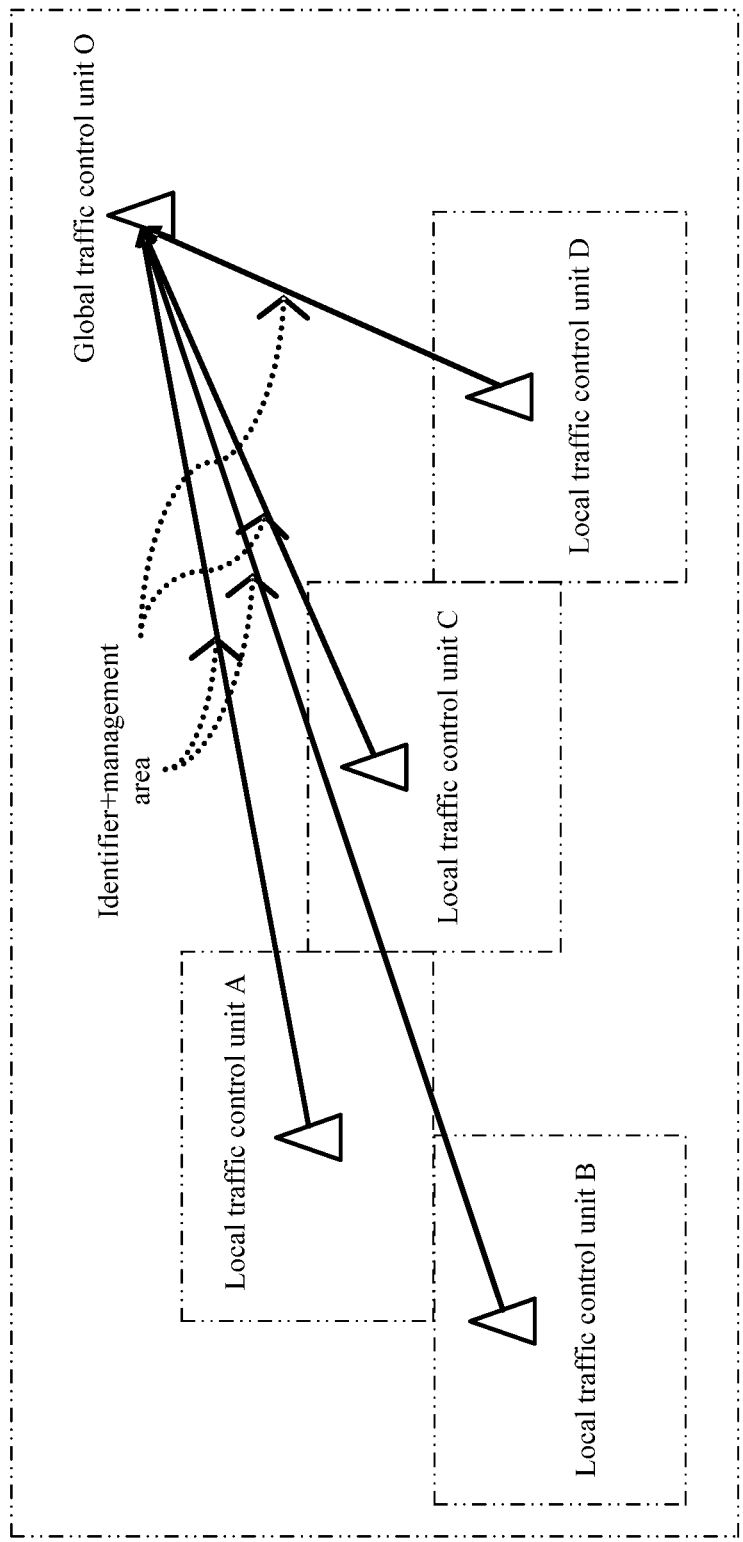
FIG. 4 is a schematic diagram of a second network architecture according to this application.

As shown in FIG. 4, a global TCU O knows a management area of a local TCU A, the management area of the local TCU B, a management area of a local TCU C, and a management area of a local TCU D.

Figure 5:
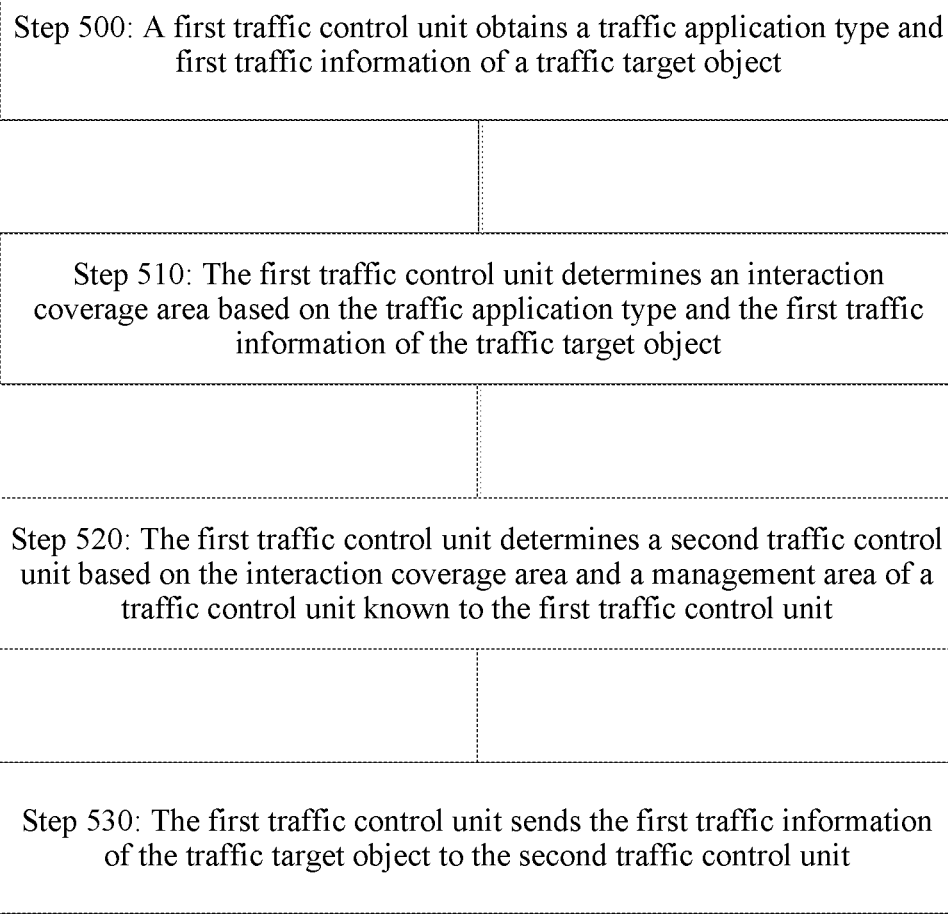
FIG. 5 is a first overview flowchart of a traffic information processing method according to this application.

Referring to FIG. 5, this application provides a traffic information processing method. The method is applied to the first network architecture. A first traffic control unit is a local traffic control unit, and management areas of traffic control units known to the first traffic control unit are management areas of all traffic control units. Alternatively, the method is applied to the second network architecture. A first traffic control unit is a global traffic control unit, and management areas of traffic control units known to the first traffic control unit are management areas of all traffic control units.

The method includes the following steps.

Step 500 The first traffic control unit obtains a traffic application type and first traffic information of a traffic target object, where the traffic application type is used to indicate a to-be-processed traffic scenario.

The traffic target object may be any one of traffic participants. The first traffic information of the traffic target object may include various types of traffic information related to the traffic target object. For example, the first traffic information may include identifier information, location information, motion information, and status information of the traffic target object. Alternatively, the first traffic information may include traffic environment information, traffic control information, and the like, for example, road condition information, information about a weather condition that endangers traffic safety, dangerous obstacle information, and natural disaster information.

A manner in which the first traffic control unit obtains the traffic application type and the first traffic information of the traffic target object may include but is not limited to the following several manners. After the first traffic control unit obtains the traffic application type and the first traffic information of the traffic target object, the first traffic control unit may create a traffic application instance. The following three manners may also be referred to as three trigger sources for creating the traffic application instance. It should be noted that the following three manners are merely used as examples, and are not intended to limit this application.

(1) The first traffic control unit obtains the first traffic information of the traffic target object and the traffic application type based on a preset instruction.

The preset instruction herein may be a traffic control instruction or another instruction, and the preset instruction may be input by a system manager to the first traffic control unit.

For example, the traffic control instruction is no entry on a road A from 9 00 to 10 00. In this case, the first traffic control unit obtains location information of the road A and status information (no entry from 9 00 to 10 00) of the road A based on the instruction, and uses these pieces of information as the first traffic information of the traffic target object. The traffic application type is traffic control.

(2) The first traffic control unit receives the first traffic information of the traffic target object, and determines the traffic application type based on the first traffic information of the traffic target object.

For example, if the first traffic control unit receives information that is about a collision between a vehicle a and a vehicle b and that is reported by a pedestrian using a communications device, the first traffic control unit may use location information of the vehicle a and the vehicle b as the first traffic information of the traffic target object, and the traffic application type is a vehicle collision.

It may be learned from the foregoing description that the first traffic information of the traffic target object that is received by the first traffic control unit may be reported by the traffic target object, or may be reported by another traffic participant. For example, the first traffic control unit receives the first traffic information of the traffic target object that is sent by another traffic control unit, or receives the first traffic information of the traffic target object and the traffic application type that are sent by another traffic control unit.

For example, the first traffic control unit receives a notification that is related to a traffic application instance and that is sent by another traffic control unit. For example, a local TCU A receives a notification that is related to a traffic application instance of an emergency vehicle prompt and that is sent by a local TCU B, and in this case, the local TCU A creates the traffic application instance of the emergency vehicle prompt based on the notification sent by the local TCU B. The notification related to the traffic application instance includes an identifier of the traffic application instance, the traffic application type, and the first traffic information of the traffic target object.

(3) The first traffic control unit determines the first traffic information of the traffic target object and the traffic application type based on a received traffic application request of the traffic target object, where the traffic application request includes the first traffic information of the traffic target object and a request type, and the request type is used to indicate the traffic application type.

For example, if a vehicle V cannot determine a local TCU with a management area in which the vehicle V moves, the vehicle V sends a coverage hole object alarm request to the first traffic control unit, where the coverage hole object alarm request includes a request type and location information and motion information of the vehicle V. In this case, the traffic application type is a coverage hole object alarm, the first traffic information of the traffic target object is the location information and the motion information of the vehicle V, and the first traffic control unit creates a traffic application instance of the coverage hole object alarm based on the request.

Step 510 The first traffic control unit determines an interaction coverage area based on the traffic application type and the first traffic information of the traffic target object, where the interaction coverage area is used to indicate a geographic area related to the to-be-processed traffic scenario.

Further, the first traffic information may include location information of the traffic target object.

The first traffic control unit determines the interaction coverage area based on the traffic application type and the location information of the traffic target object, with reference to map information, and using a location of the traffic target object as a reference point.

For example, an area whose center is the location of the traffic target object and radius is 2 kilometers (km) is used as the interaction coverage area.

For another example, the location of the traffic target object is used as a start point, and an area including three intersections in a traveling forward direction of the traffic target object is used as the interaction coverage area.

Herein, only an example is provided, and a specific algorithm may be determined based on a specific traffic application type.

In addition, the first traffic control unit may determine the interaction coverage area with reference to other information. For example, the other information may be information about another traffic application instance in the first traffic control unit, to meet a requirement of a complex traffic application scenario.

For example, the first traffic control unit includes two traffic application instances a traffic application instance of route navigation and a traffic application instance of a congestion ahead notification. When determining an interaction coverage area of the traffic application instance of the congestion ahead notification, the first traffic control unit further needs to use an area in which a traffic participant involved in the traffic application instance of the route navigation is located as the interaction coverage area, to send a congestion ahead notification to the traffic participant.

Step 520 The first traffic control unit determines a second traffic control unit based on the interaction coverage area and a management area of a traffic control unit known to the first traffic control unit, where there is an overlapping area between a management area of the second traffic control unit and the interaction coverage area, and the second traffic control unit is different from the first traffic control unit.

Further, the management area of the traffic control unit known to the first traffic control unit is a management area of each of all traffic control units, and the first traffic control unit determines, based on the interaction coverage area and the management area of the traffic control unit known to the first traffic control unit, a traffic control unit whose management area overlaps the interaction coverage area.

Step 530 The first traffic control unit sends the first traffic information of the traffic target object to the second traffic control unit.

Optionally, the first traffic control unit may further send the traffic application type and an identifier of the traffic application instance to the second traffic control unit. The traffic application instance is created by the first traffic control unit based on the first traffic information of the traffic target object and the traffic application type.

In a possible design, after the first traffic control unit receives the traffic application type and the first traffic information of the traffic target object that are sent by the second traffic control unit, if the first traffic control unit determines the second traffic control unit, the first traffic control unit no longer sends the traffic application type and the first traffic information of the traffic target object to the second traffic control unit, to avoid resource waste caused by repeated notification.

In a possible design, after the first traffic control unit sends the traffic application type and the first traffic information of the traffic target object to the second traffic control unit, the first traffic control unit receives a first message sent by the second traffic control unit. The first message is used to indicate that the second traffic control unit determines to receive the traffic application type and the first traffic information of the traffic target object.

For example, after the local TCU A receives the traffic application type and the first traffic information of the traffic target object that are sent by the local TCU B, the local TCU A determines the local TCU B and a local TCU C based on the interaction coverage area and the management area of the traffic control unit known to the first traffic control unit, and no longer sends the traffic application type and the first traffic information of the traffic target object to the local TCU B, but sends the traffic application type and the first traffic information of the traffic target object to the local TCU C. After receiving the traffic application type and the first traffic information of the traffic target object, the local TCU C sends, to the local TCU A, a message indicating that the local TCU C determines to receive the traffic application type and the first traffic information of the traffic target object.

In particular, for the first network architecture, if the first traffic control unit determines the first traffic control unit, there is an overlapping area between a management area of the first traffic control unit and the interaction coverage area.

The first traffic control unit further determines a traffic participant in the overlapping area between the management area of the first traffic control unit and the interaction coverage area, and sends the first traffic information of the traffic target object to the traffic participant, or receives second traffic information sent by the traffic participant, and sends the second traffic information to the traffic target object.

The traffic participant is a communication object in the overlapping area between the management area of the first traffic control unit and the interaction coverage area within a preset time.

In addition, before the first traffic control unit receives the second traffic information sent by the traffic participant, the first traffic control unit needs to send an instruction message to the traffic participant. The instruction message is used to instruct the traffic participant to report the second traffic information.

In a possible design, after the first traffic control unit sends the first traffic information of the traffic target object to the traffic participant, the first traffic control unit receives a second message sent by the traffic participant. The second message is used to indicate that the traffic participant determines to receive the first traffic information of the traffic target object.

In a possible design, after the first traffic control unit receives the second traffic information sent by the traffic participant, the first traffic control unit sends a third message to the traffic participant. The third message is used to indicate that the first traffic control unit determines to receive the second traffic information sent by the traffic participant.

Figure 6:
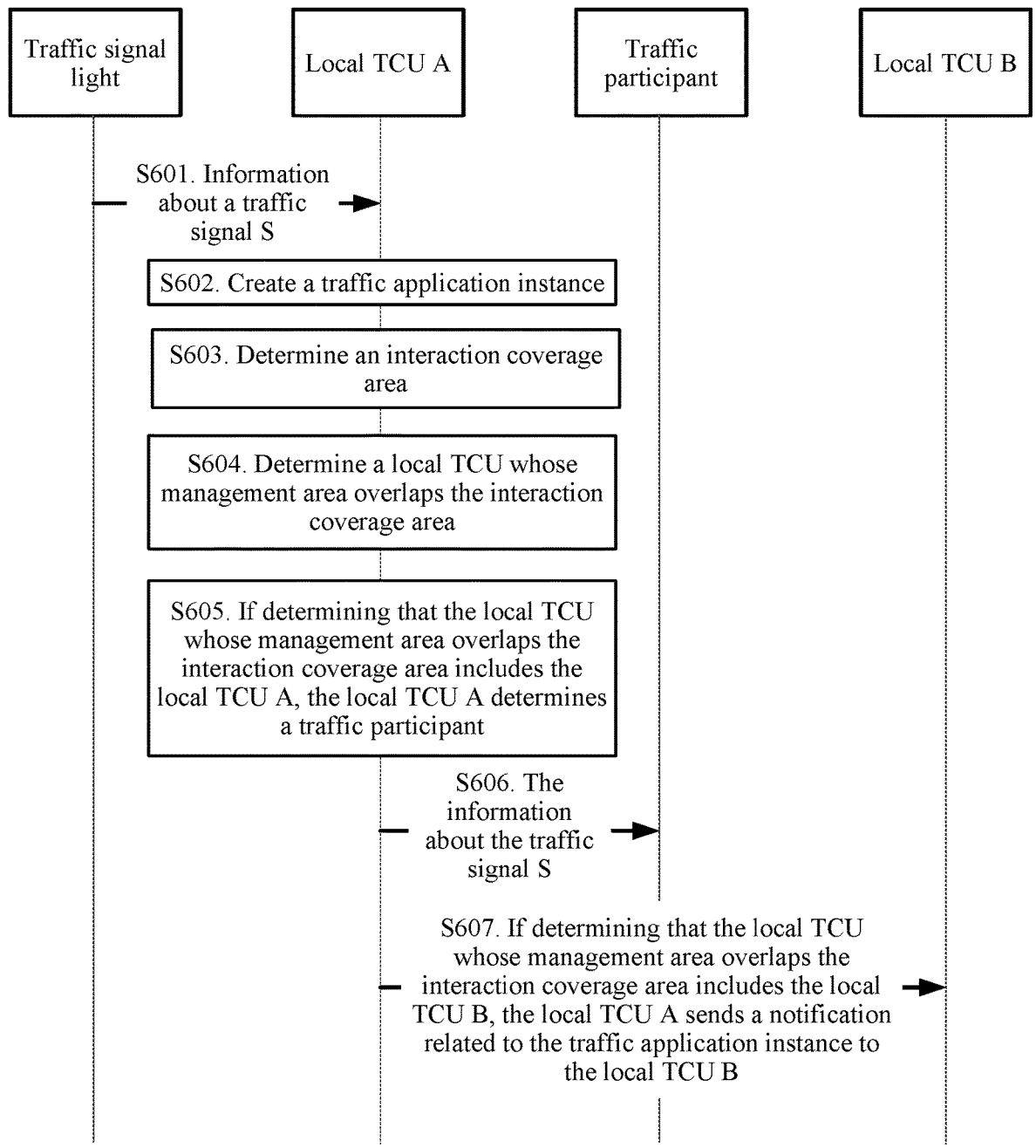
FIG. 6 is a processing flowchart of a traffic application instance of a traffic signal notification according to this application.

As shown in FIG. 6, the embodiment shown in FIG. 5 is described below in detail with reference to a specific embodiment.

When a local TCU A, a local TCU B, and a local TCU C are deployed or change, the local TCU A, the local TCU B, and the local TCU C notify each other of identifiers of each other and management areas for which the local TCU A, the local TCU B, and the local TCU C are responsible. Therefore, the local TCU A knows existence of the local TCU B and the local TCU C and the management areas respectively corresponding to the local TCU B and the local TCU C.

S601. The local TCU A receives information about a traffic signal S.

The traffic signal S is fixedly deployed in the management area of the local TCU A. A control unit of the traffic signal S actively sends or sends, after receiving a request from the local TCU A, the information about the traffic signal S to the local TCU A.

The information about the traffic signal S may include an identifier, a location, and a current phase status of the traffic signal S, and remaining duration of the current signal. The phase status may include signal types such as pass, stop, slow down, limit a speed, and take a turn.

The information about the traffic signal S is first traffic information of a traffic target object.

S602. The local TCU A determines that a traffic application type is a traffic signal notification, and creates a traffic application instance based on the received information about the traffic signal S.

S603. The local TCU A determines an interaction coverage area.

Further, the local TCU A determines the interaction coverage area based on the location of the traffic signal S, information that the traffic application type is the traffic signal notification, and map information.

Further, the interaction coverage area may include an area that is on a road controlled by the traffic signal S and in a direction close to the traffic signal S and whose distance to the traffic signal S is less than or equal to a preset distance (for example, 1 km) or from which a quantity of intersections to the traffic signal S is less than or equal to a preset quantity of intersections (for example, three intersections).

It should be understood that each application type corresponds to one algorithm of the interaction coverage area. The algorithm of the interaction coverage area that is provided in this application is merely used as an example, and is not intended to limit this application.

S604. The local TCU A determines, based on the interaction coverage area and a management area of a known TCU, a local TCU whose management area overlaps the interaction coverage area.

If determining that the local TCU whose management area overlaps the interaction coverage area includes the local TCU A, the local TCU A performs S605.

If determining that the local TCU whose management area overlaps the interaction coverage area includes the local TCU B, the local TCU A performs S607.

S605. If the local TCU A determines that the local TCU whose management area overlaps the interaction coverage area includes the local TCU A, the local TCU A further determines a traffic participant in an overlapping area between the management area of the local TCU A and the interaction coverage area.

S606. The local TCU A sends the information about the traffic signal S to the traffic participant.

The procedure ends.

Further, the local TCU A further determines that the traffic participant in the management area of the local TCU A is a traffic participant P that may be a vehicle, a vehicle user, and/or a pedestrian. The local TCU A sends the information about the traffic signal S to the traffic participant P such that the traffic participant P acts, for example, passes, stops, takes a turn, or adjusts a speed, based on the traffic signal S. The traffic participant P may return an acknowledgment for receiving the information about the traffic signal S to the local TCU A.

S607. If the local TCU A determines that the local TCU whose management area overlaps the interaction coverage area includes the local TCU B, the local TCU A sends a notification related to the traffic application instance to the local TCU B.

The notification related to the traffic application instance includes an identifier of the traffic application instance, the information about the traffic signal S, and the information that the traffic application type is the traffic signal notification.

The procedure ends.

Further, the local TCU B receives the notification that is related to the traffic application instance and that is sent by the local TCU A, and the local TCU B may send an acknowledgment for receiving the notification related to the traffic application instance to the local TCU A. The local TCU B repeatedly performs S602 to S607. The local TCU B creates a traffic application instance, determines an interaction coverage area and a traffic control unit, and provides interaction support for a traffic participant that is involved in the traffic application instance and that is in the management area of the local TCU B. This is the same as the processing procedure of the local TCU A, and no repeated description is provided.

Optionally, because the local TCU B is not a TCU that first receives the information about the traffic signal S and the information that the traffic application type is the traffic signal notification, the information about the traffic signal S and the information that the traffic application type is the traffic signal notification are no longer sent to another local TCU.

Therefore, in the embodiment shown in FIG. 6, the local TCU A accurately determines the interaction coverage area and the traffic participant using a centralized decision mechanism, thereby supporting complex traffic application interaction and effectively reducing waste of communication resources and processing resources.

A type of the foregoing traffic application instance is the traffic signal notification, and the traffic target object is a fixedly deployed object.

When the traffic target object is a fixedly deployed object (for example, a traffic signal light or a sign post) or a relatively fixed object upon appearance (for example, a road congestion point or an obstacle), the traffic control unit needs to transmit information about the traffic target object to a traffic participant (for example, a vehicle, a vehicle user, or a pedestrian) in a specific area that uses a location of the traffic target object as a reference point. Traffic application types that meet the foregoing condition are classified into a main type of traffic application type. The main type of traffic application type may further include display of a sign in a vehicle, a congestion ahead notification, and a dangerous obstacle alarm.

Processing procedures of traffic application instances of these traffic application types are basically the same as the processing procedure of the traffic application instance of the traffic signal notification.

For example, in a traffic application instance of the display of a sign in a vehicle, a fixedly deployed traffic sign is used as the traffic target object, and a control unit of the traffic sign sends information about the traffic sign to the local TCU A. The interaction coverage area includes an area that is on a road controlled by the traffic sign and whose distance to the traffic sign is less than or equal to a preset distance or from which a quantity of intersections to the traffic sign is less than or equal to a preset quantity of intersections. The local TCU A determines local TCUs whose management areas overlap the interaction coverage area. The local TCU A sends the information about the traffic sign and information that the traffic application type is the display of a sign in a vehicle to these local TCUs. Then these local TCUs determine traffic participants in overlapping areas respectively corresponding to these local TCUs, and then send the information about the traffic sign to these traffic participants. After receiving the information about the traffic sign, these traffic participants may display the information about the traffic sign in vehicles.

For example, in a traffic application instance of the congestion ahead notification, a suddenly-appearing congestion report point is used as the traffic target object, and a nearby roadside monitoring device, a passing vehicle, a passing vehicle user, a passing pedestrian, or the like sends congestion report information to the local TCU A. The interaction coverage area includes an area that is on a connected road around the congestion report point and in a direction close to the congestion report point and whose distance to the congestion report point is less than or equal to a preset distance or from which a quantity of intersections to the congestion report point is less than or equal to a preset quantity of intersections. The local TCU A determines local TCUs whose management areas overlap the interaction coverage area. The local TCU A sends the congestion report information and information that the traffic application type is the congestion ahead notification to these local TCUs. Then, these local TCUs determine traffic participants in overlapping areas respectively corresponding to these local TCUs, for example, a vehicle, a vehicle user, and a pedestrian, and send the congestion report information to these traffic participants. After receiving the congestion report information, these traffic participants may adjust a traveling route.

For example, in a traffic application instance of the dangerous obstacle alarm, a suddenly-appearing obstacle on a road is used as the traffic target object, and a nearby roadside monitoring device, a passing vehicle, a passing vehicle user, a passing pedestrian, or the like sends road obstacle information to the local TCU A. The interaction coverage area includes an area that is on a road on which the obstacle is located and in a direction close to the obstacle and whose distance to the obstacle is less than or equal to a preset distance or from which a quantity of intersections to the obstacle is less than or equal to a preset quantity of intersections. The local TCU A determines local TCUs whose management areas overlap the interaction coverage area. The local TCU A sends the road obstacle information and information that the traffic application type is the dangerous obstacle alarm to these local TCUs. Then, these local TCUs determine traffic participants in overlapping areas respectively corresponding to these local TCUs, for example, a vehicle, a vehicle user, and a pedestrian, and send the road obstacle information to these traffic participants. After receiving the road obstacle information, these traffic participants may be vigilant against the obstacle during traveling forward.

Referring to FIG. 7, this application provides a traffic information processing method. The method is applied to the second network architecture. A first traffic control unit is a local traffic control unit, and when a local TCU is deployed or changes, the local TCU notifies a global TCU of an identifier of the local TCU and a management area for which the local TCU is responsible. The local TCU does not know existence of all local TCUs and management areas of all the local TCUs. Therefore, a management area of a traffic control unit known to the first traffic control unit does not include a management area of a traffic control unit other than the first traffic control unit.

The method includes the following steps.

Step 700 The first traffic control unit obtains a traffic application type and first traffic information of a traffic target object, where the traffic application type is used to indicate a to-be-processed traffic scenario.

A processing process of step 700 is the same as the processing process of step 500 in FIG. 5, and no repeated description is provided.

Step 710 The first traffic control unit determines an interaction coverage area based on the traffic application type and the first traffic information of the traffic target object, where the interaction coverage area is used to indicate a geographic area related to the to-be-processed traffic scenario.

A processing process of step 710 is the same as the processing process of step 510 in FIG. 5, and no repeated description is provided.

Step 720 If the first traffic control unit determines that there is an overlapping area between the interaction coverage area and a management area of a traffic control unit other than the first traffic control unit, the first traffic control unit sends the first traffic information of the traffic target object to a second traffic control unit, where the first traffic control unit knows a management area of the first traffic control unit, and the second traffic control unit knows a management area of each traffic control unit.

Further, the first traffic control unit may determine, based on the interaction coverage area, whether the management area of the first traffic control unit exactly includes the interaction coverage area.

Figure 8A:
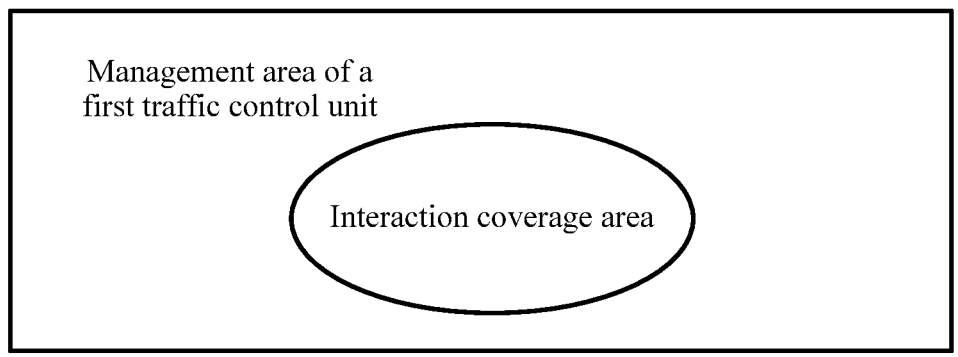
FIG. 8A is a first schematic diagram of a relationship between a management area of a first traffic control unit and an interaction coverage area according to this application.

As shown in FIG. 8A, the management area of the first traffic control unit includes the interaction coverage area, in other words, the interaction coverage area exactly falls within the management area of the first traffic control unit. In this case, the first traffic control unit does not need to send the first traffic information of the traffic target object to the second traffic control unit.

Figure 8B:
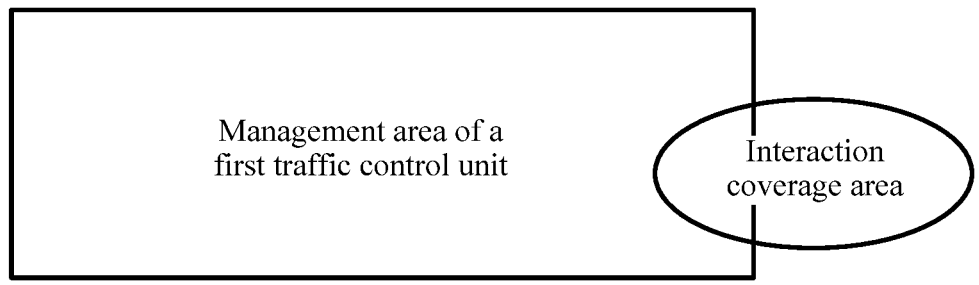
FIG. 8B is a second schematic diagram of a relationship between a management area of a first traffic control unit and an interaction coverage area according to this application.

As shown in FIG. 8B, there is an overlapping area between the management area of the first traffic control unit and the interaction coverage area, but the interaction coverage area partially falls within the management area of the first traffic control unit. In this case, the first traffic control unit needs to send the first traffic information of the traffic target object to the second traffic control unit.

The first traffic control unit is a local traffic control unit, and the second traffic control unit is a global traffic control unit.

In a possible design, if determining that a third traffic control unit is different from the second traffic control unit, the first traffic control unit sends the first traffic information of the traffic target object to the second traffic control unit, where the third traffic control unit is a traffic control unit that sends the first traffic information of the traffic target object to the first traffic control unit, to avoid resource waste caused by repeated notification.

In a possible design, after the first traffic control unit sends the first traffic information of the traffic target object to the second traffic control unit, the first traffic control unit receives a first message sent by the second traffic control unit. The first message is used to indicate that the second traffic control unit determines to receive the first traffic information of the traffic target object. According to the method provided in this application, the first traffic control unit can determine that the first traffic information of the traffic target object is accurately notified to the second traffic control unit.

Figure 9:
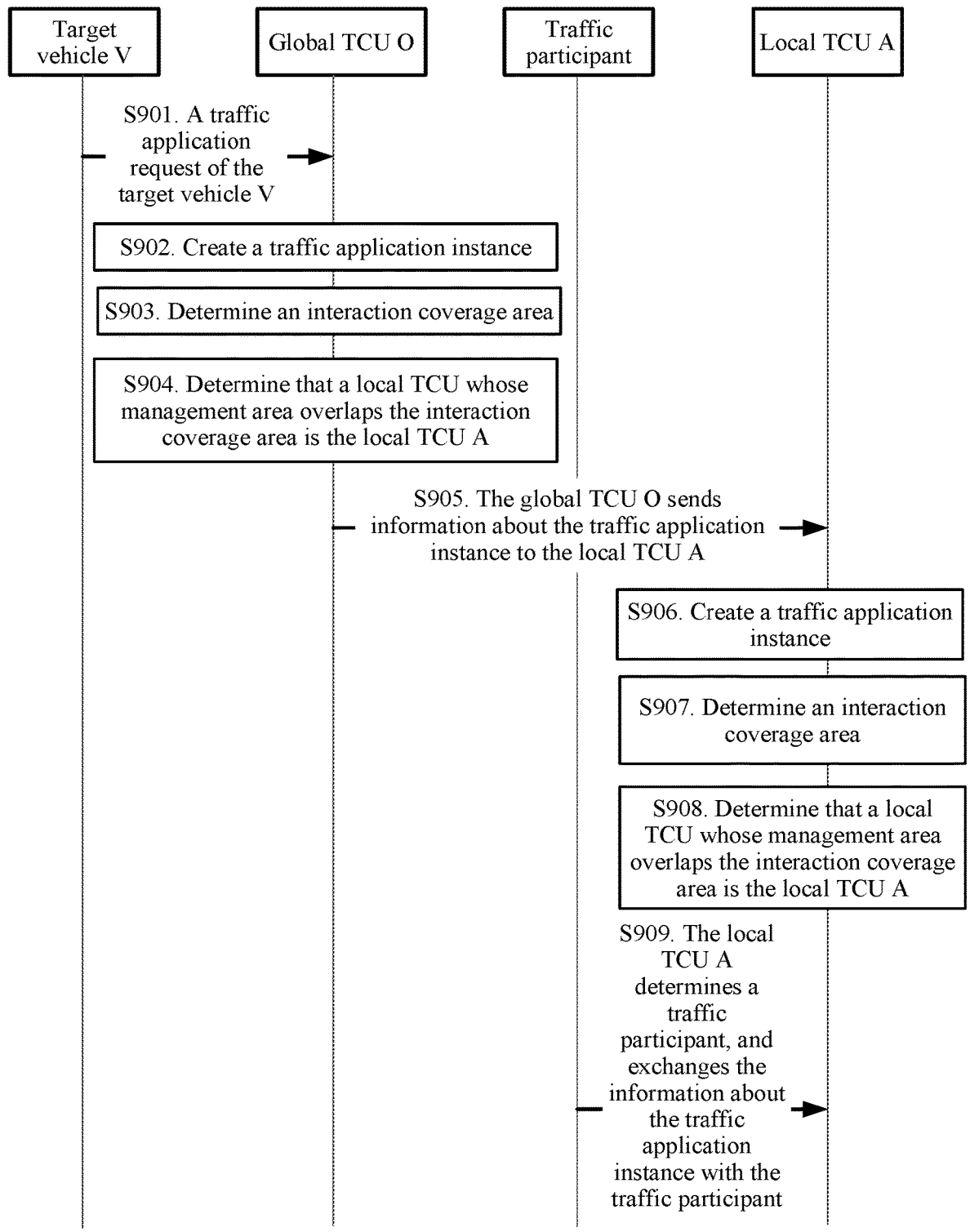
FIG. 9 is a processing flowchart of a traffic application instance of a coverage hole object alarm according to this application.

As shown in FIG. 9, the embodiment shown in FIG. 7 is described below in detail with reference to a specific embodiment.

When a local TCU A, a local TCU B, and a local TCU C are deployed or change, the local TCU A, the local TCU B, and the local TCU C notify a global TCU O of identifiers of the local TCU A, the local TCU B, and the local TCU C and management areas for which the local TCU A, the local TCU B, and the local TCU C are respectively responsible. Therefore, the global TCU O knows existence of the local TCU A, the local TCU B, and the local TCU C and the management areas respectively corresponding to the local TCU A, the local TCU B, and the local TCU C. However, the local TCU A, the local TCU B, and the local TCU C do not know existence of each other and the management areas of each other.

S901. The global TCU O receives a traffic application request of a target vehicle V.

Further, the target vehicle V cannot determine a local TCU with an area in which the target vehicle V moves and for which the local TCU is responsible, and sends a coverage hole object alarm request to the global TCU O. The target vehicle V is used as a traffic target object. The coverage hole object alarm request includes a request type and information about the vehicle V.

The information about the target vehicle V may include an identifier, a location, and a motion status of the target vehicle V. The motion status may include a direction, a speed, acceleration, an angular velocity, and the like.

S902. The global TCU O creates a traffic application instance based on the received traffic application request of the target vehicle V.

A trigger source for creating the traffic application instance by the global TCU O belongs to the manner (3) in step 500.

S903. The global TCU O determines an interaction coverage area.

Further, the global TCU O determines that a traffic application type is a coverage hole object alarm, and the global TCU O determines the interaction coverage area of the traffic application instance based on the location of the target vehicle V, information that the traffic application type is the coverage hole object alarm, and map information.

Further, the interaction coverage area may include an area that is around the target vehicle V, not in an observation direction of the target vehicle V, and within a specific distance (for example, 100 meters (m)) to the target vehicle V.

S904. The global TCU O determines, based on the interaction coverage area and a management area of a known TCU, that a local TCU whose management area overlaps the interaction coverage area is the local TCU A.

S905. The global TCU O sends information about the traffic application instance to the local TCU A.

The information about the traffic application instance includes an identifier of the traffic application instance, the information about the target vehicle V, and the information that the traffic application type is the coverage hole object alarm.

S906. The local TCU A creates a traffic application instance.

When the local TCU A receives the information about the traffic application instance that is sent by the global TCU O, the local TCU A creates the traffic application instance.

Optionally, the local TCU A may return an acknowledgment for receiving the information about the traffic application instance to the global TCU O.

S907. The local TCU A determines an interaction coverage area.

S908. The local TCU A determines, based on the interaction coverage area and a management area of a known TCU, that a local TCU whose management area overlaps the interaction coverage area is the local TCU A.

A processing procedure of S907 and S908 is the same as the processing procedure of S903 and S904. However, because the local TCU A is not a TCU that first creates the traffic application instance, and the local TCU A creates the traffic application instance based on the information about the traffic application instance that is sent by the global TCU O, the local TCU A no longer sends the information about the traffic application instance to the global TCU O.

S909. The local TCU A determines a traffic participant in the management area of the local TCU and the interaction coverage area, and exchanges the information about the traffic application instance with the traffic participant.

The local TCU A determines the traffic participant that is involved in the traffic application instance and that is in the management area, for example, a traffic participant R. The traffic participant R or a nearby roadside monitoring device sends information about the traffic participant R to the local TCU A after the traffic participant R is found. The information about the traffic participant R may include a location and a motion status of the traffic participant R. The motion status may include a direction, a speed, acceleration, an angular velocity and the like. The local TCU A sends the information about the traffic participant R to the target vehicle V such that the target vehicle V learns of an object in a coverage hole of the target vehicle V and is vigilant against collision with the object, for example, diverts movement away from or gives up moving to the coverage hole. The target vehicle V may return an acknowledgment for receiving the information about the traffic participant R to the local TCU A.

Therefore, in this embodiment shown in FIG. 9, the global TCU accurately determines, using a centralized decision mechanism across TCUs with reference to the information about the target vehicle V, the map information, and the management area of the known TCU, an object that may collide with the target vehicle in the coverage hole around the target vehicle, and the target vehicle may return an acknowledgment for receiving information about the object in the coverage hole to the TCU. Therefore, the interaction coverage area of the traffic application instance of the coverage hole object alarm and the information that is about the object in the coverage hole and with which the target vehicle actually needs to be alarmed are accurately determined, thereby supporting complex traffic application interaction and effectively reducing waste of communication resources and processing resources.

A type of the foregoing traffic application instance is the coverage hole object alarm, and the target vehicle V is an object that can move.

When the traffic target object is an object (for example, a vehicle, a vehicle user, or a pedestrian) that can move, the traffic control unit needs to transmit, to the traffic target object, information about a traffic participant (for example, an object in a coverage hole, or vehicles whose tracks intersect) in a specific area that uses a location of the traffic target object as a reference point. Application types of traffic application instances that meet the foregoing condition are classified into a main type of application type of traffic application instance. The main type of application type of traffic application instance may further include an intersection collision warning and the like.

Processing procedures of traffic application instances of these application types are basically the same as the processing procedure of the traffic application instance of the coverage hole object alarm.

For example, in a traffic application instance of the intersection collision warning, a moving target vehicle is used as the traffic target object, and the target vehicle sends location information and motion status information of the target vehicle to the local TCU A or the global TCU. The interaction coverage area includes an area that is within an area of an intersection before the target vehicle in a traveling forward direction and whose distance to the target vehicle is less than or equal to a preset distance. The local TCU A or the global TCU determines local TCUs whose management areas overlap the interaction coverage area, and the local TCU A or the global TCU sends information about the target vehicle and information that the traffic application type is the intersection collision warning to these local TCUs. Then, these local TCUs determine traffic participants in overlapping areas respectively corresponding to these local TCUs. For example, the traffic participants are other vehicles that are in various directions and whose tracks may intersect with a track of the target vehicle. After receiving location information and motion status information of these vehicles, the target vehicle is vigilant against collision with these vehicles when passing the intersection.

In addition, when the traffic target object is an object (for example, an emergency vehicle, an abnormal vehicle, or a weak traffic participant) that can move, the traffic control unit needs to transmit information about the traffic target object to a traffic participant (for example, a vehicle, a vehicle user, or roadside infrastructure) in a specific area that uses a location of the traffic target object as a reference point. Application types of traffic application instances that meet the foregoing condition are classified into a main type of application type of traffic application instance. The main type of application type of traffic application instance includes an emergency vehicle prompt, an abnormal vehicle alarm, a weak traffic participant warning, and the like.

Figure 10A:
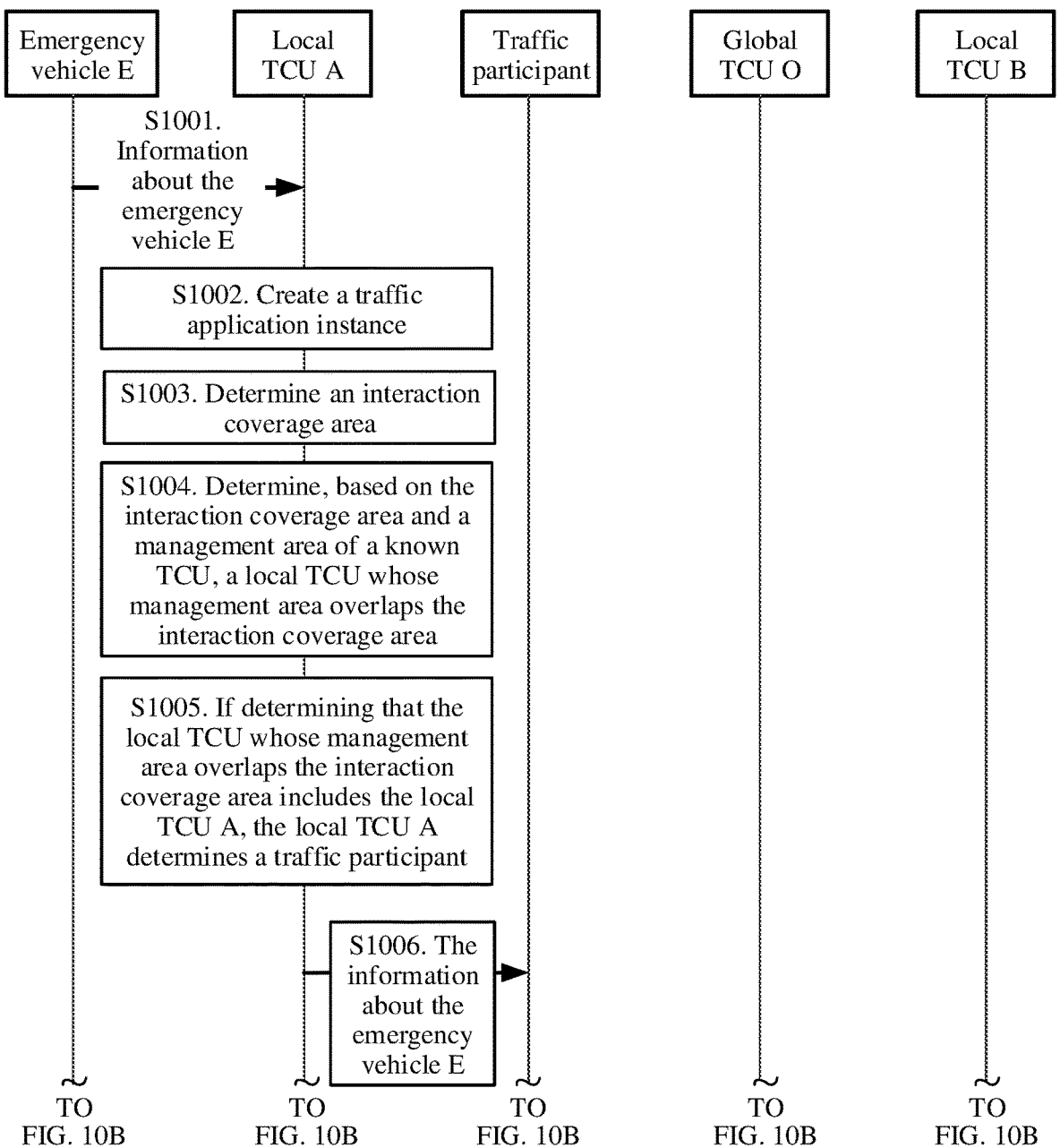
FIG. 10A and FIG. 10B are a processing flowchart of a traffic application instance of an emergency vehicle prompt according to this application.
Figure 10B:
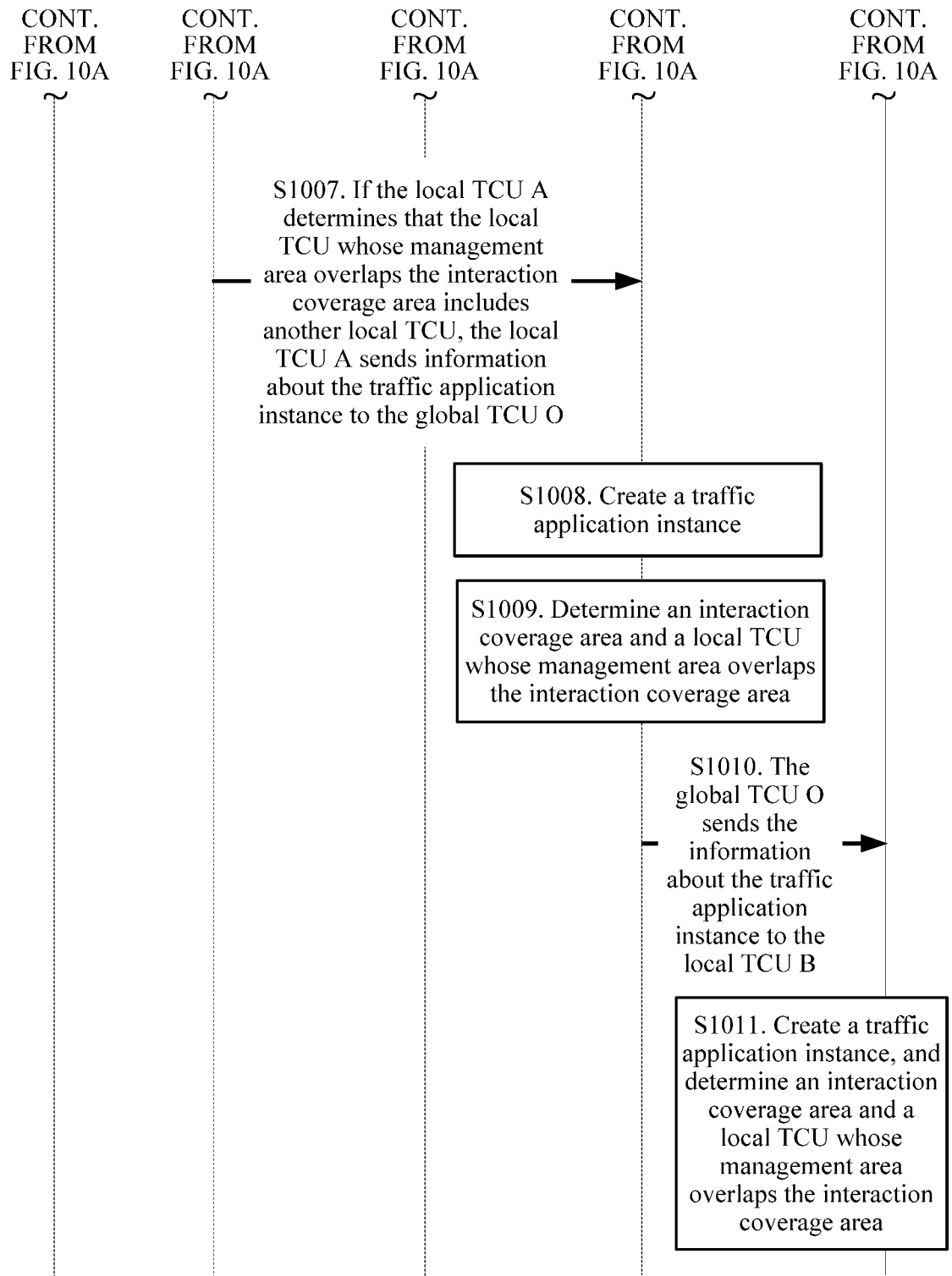

With reference to FIG. 10A and FIG. 10B, the embodiment shown in FIG. 7 is described below in detail using an example of a traffic application instance of an emergency vehicle prompt.

When a local TCU A, a local TCU B, and a local TCU C are deployed or change, the local TCU A, the local TCU B, and the local TCU C notify a global TCU O of identifiers of the local TCU A, the local TCU B, and the local TCU C and management areas for which the local TCU A, the local TCU B, and the local TCU C are responsible. Therefore, the global TCU O knows existence of the local TCU A, the local TCU B, and the local TCU C and the management areas respectively corresponding to the local TCU A, the local TCU B, and the local TCU C. However, the local TCU A, the local TCU B, and the local TCU C do not know existence of all local TCUs and management areas of all the local TCUs.

S1001. The local TCU A receives information about an emergency vehicle E.

The emergency vehicle E moves in the management area of the local TCU A. The emergency vehicle E or a nearby roadside monitoring device sends the information about the emergency vehicle E to the local TCU A after the emergency vehicle E is found. The information about the emergency vehicle E may include an identifier, a current location, and a motion status of the emergency vehicle E. The motion status may include a direction, a speed, acceleration, an angular velocity, and the like. The local TCU A may return an acknowledgment for receiving the information about the emergency vehicle E to an object that reports the information about the emergency vehicle E.

S1002. The local TCU A creates a traffic application instance based on the received information about the emergency vehicle E.

A trigger source for creating the traffic application instance by the local TCU A belongs to the manner (2) in step 500.

S1003. The local TCU A determines an interaction coverage area.

Further, the local TCU A determines that a traffic application type is the emergency vehicle prompt, and the local TCU A determines the interaction coverage area of the traffic application instance based on the location of the emergency vehicle E, information that the application type of the traffic application instance is the emergency vehicle prompt, and map information.

Further, the interaction coverage area may include an area that is on a traveling road of the emergency vehicle E and in a traveling forward direction and whose distance to the emergency vehicle E is less than or equal to a preset distance (for example, 300 m).

S1004. The local TCU A determines, based on the interaction coverage area and a management area of a known TCU, a local TCU whose management area overlaps the interaction coverage area.

Because the local TCU A does not know existence and a management area of another local TCU, the following two cases may be included If determining that the local TCU whose management area overlaps the interaction coverage area includes the local TCU A, the local TCU A performs S1005.

If determining that the local TCU whose management area overlaps the interaction coverage area includes another local TCU, in other words, the interaction coverage area partially falls within the management area of the local TCU A, the local TCU A performs 1007.

S1005. If the local TCU A determines that the local TCU whose management area overlaps the interaction coverage area includes the local TCU A, the local TCU A further determines a traffic participant in an overlapping area between the management area of the local TCU A and the interaction coverage area.

S1006. The local TCU A sends the information about the emergency vehicle E to the traffic participant.

The procedure ends.

Further, the local TCU A further determines that the traffic participant that is involved in the traffic application instance and that is in the management area of the local TCU A is a traffic participant Q that may be a vehicle, a vehicle user, and/or roadside infrastructure. The local TCU A sends the information about the emergency vehicle E to the traffic participant Q such that the traffic participant Q provides convenience for traveling of the emergency vehicle E. For example, a vehicle ahead of the emergency vehicle E on the traveling road in the traveling forward direction gives way to the emergency vehicle E, or roadside infrastructure such as a traffic signal ahead of the emergency vehicle E on the traveling road in the traveling forward direction adjusts a phase status for the emergency vehicle E. The traffic participant Q may return an acknowledgment for receiving the information about the emergency vehicle E to the local TCU A.

S1007. If the local TCU A determines that the local TCU whose management area overlaps the interaction coverage area includes another local TCU, the local TCU A sends information about the traffic application instance to the global TCU O.

The information about the traffic application instance may include an identifier of the traffic application instance, the information that the application type of the traffic application instance is the emergency vehicle prompt, and the information about the emergency vehicle E.

S1008. The global TCU O creates a traffic application instance based on the received information about the traffic application instance that is sent by the local TCU A.

S1009. The global TCU O determines an interaction coverage area and a local TCU whose management area overlaps the interaction coverage area.

This is the same as the processing procedure of the local TCU A. When determining that local TCUs related to the traffic application instance include the local TCU A and the local TCU B, but do not include the local TCU C, the global TCU O performs S1010.

S1010. The global TCU O sends the information about the traffic application instance to the local TCU B, but does not transmit the information back to the local TCU A.

S1011. The local TCU B creates a traffic application instance based on the information about the traffic application instance that is sent by the global TCU O, and determines an interaction coverage area and a local TCU whose management area overlaps the interaction coverage area.

This is the same as the processing procedure of the local TCU A or the global TCU O.

Because the local TCU B is not a TCU that first creates the traffic application instance, the information about the traffic application instance is no longer sent to another local TCU.

For the traffic application instance of the emergency vehicle prompt, the local TCU independently determines the interaction coverage area of the traffic application instance based on the application type of the traffic application instance and the information about the emergency vehicle and with reference to the map information, further determines an actually involved traffic participant in the management area of the local TCU, sends the information about the emergency vehicle to the traffic participant, and receives an acknowledgement returned by the traffic participant. In addition, when the local TCU whose management area overlaps the interaction coverage area further includes another local TCU, the local TCU sends the information about the traffic application instance to the global TCU for processing, to send the information about the emergency vehicle to another traffic participant that is involved in the traffic application instance and that is in an interaction coverage area outside the management area of the local TCU.

After receiving the information about the traffic application instance, the global TCU O independently determines the interaction coverage area based on the application type of the traffic application instance and the information about the emergency vehicle and with reference to the map information, then determines a local TCU involved in the traffic application instance with reference to the management area of each known local TCU, and sends the information about the traffic application instance to the local TCU involved in the traffic application instance for processing, but does not transmit the information about the traffic application instance back to the local TCU from which the information about the traffic application instance comes, to send the information about the emergency vehicle to another traffic participant involved in the traffic application instance.

In this embodiment of this application, the traffic application instance of the emergency vehicle prompt is implemented through coordination using a TCU as a kernel, a vehicle and roadside infrastructure ahead of the emergency vehicle are accurately determined across TCUs with reference to the information about the emergency vehicle, the map information, and the management area of the known TCU, and the vehicle and the road infrastructure may return an acknowledgment for receiving the information about the emergency vehicle to the TCU.

Processing procedures of traffic application instances of these application types are basically the same as the processing procedure of the traffic application instance of the emergency vehicle prompt.

For example, in a traffic application instance of an abnormal vehicle alarm, an abnormal vehicle that suddenly appears and that can move is used as the traffic target object, and the abnormal vehicle, a nearby roadside monitoring device, a passing vehicle, a passing vehicle user, a passing pedestrian, or the like sends information about the abnormal vehicle to the local TCU A. The interaction coverage area includes an area that is on a road and after the abnormal vehicle in a traveling forward direction and whose distance to the abnormal vehicle is less than or equal to a preset distance. The local TCU A determines local TCUs whose management areas overlap the interaction coverage area. The local TCU A sends the information about the abnormal vehicle and information that the traffic application type is the abnormal vehicle alarm to these local TCUs. Then, these local TCUs determine traffic participants in overlapping areas respectively corresponding to these local TCUs. For example, the traffic participants are a vehicle and a vehicle user. After receiving the information about the abnormal vehicle, these traffic participants may be vigilant against collision with the abnormal vehicle during traveling forward.

For example, in a traffic application instance of a weak traffic participant warning, a weak traffic participant (for example, a pedestrian or a rider) that suddenly appears and that can move is used as the traffic target object, and the weak traffic participant, a nearby roadside monitoring device, a passing vehicle, a passing vehicle user, a passing pedestrian, or the like sends information about the weak traffic participant to the local TCU A. The interaction coverage area includes an area that is on a connected road around the weak traffic participant and in a direction close to the weak traffic participant and whose distance to the weak traffic participant is less than or equal to a preset distance. The local TCU A determines local TCUs whose management areas overlap the interaction coverage area. The local TCU A sends the information about the weak traffic participant and information that the traffic application type is the weak traffic participant warning. Then, these local TCUs determine traffic participants in overlapping areas respectively corresponding to these local TCUs. For example, the traffic participants herein are a vehicle and a vehicle user. After receiving the information about the weak traffic participant, these traffic participants may be vigilant against collision with the weak traffic participant during traveling forward, traveling backward, or taking a turn.

Figure 11:
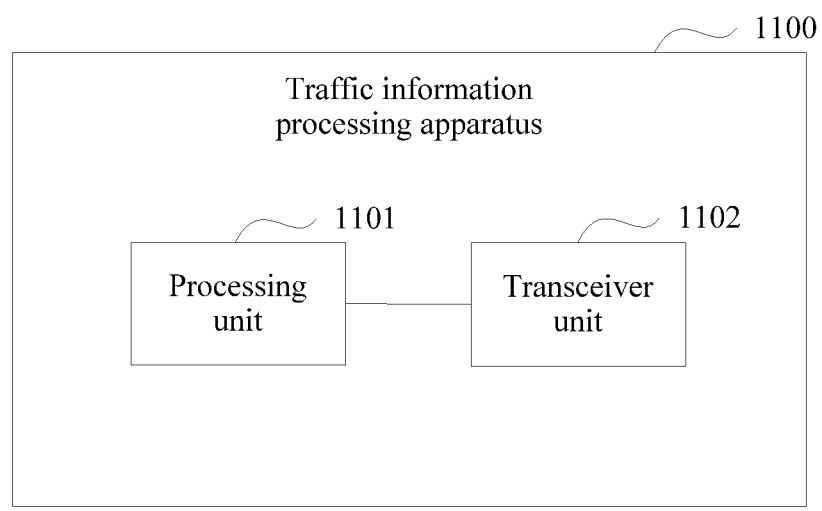
FIG. 11 is a first schematic structural diagram of a traffic information processing apparatus according to this application.

Based on the foregoing embodiment, referring to FIG. 11, this application provides a traffic information processing apparatus 1100 configured to implement the method shown in FIG. 5. The apparatus 1100 includes a processing unit 1101 configured to obtain a traffic application type and first traffic information of a traffic target object, where the traffic application type is used to indicate a to-be-processed traffic scenario, determine an interaction coverage area based on the traffic application type and the first traffic information of the traffic target object, where the interaction coverage area is used to indicate a geographic area related to the to-be-processed traffic scenario, and determine a second traffic control unit based on the interaction coverage area and a management area of a traffic control unit known to the first traffic control unit, where there is an overlapping area between a management area of the second traffic control unit and the interaction coverage area, and the second traffic control unit is different from the first traffic control unit, and a transceiver unit 1102 configured to send the traffic application type and the first traffic information of the traffic target object to the second traffic control unit.

In a possible design, the processing unit 1101 is configured to obtain the first traffic information of the traffic target object and the traffic application type based on a preset instruction, or the transceiver unit 1102 is configured to receive the first traffic information of the traffic target object, and the processing unit 1101 is configured to determine the traffic application type based on the first traffic information of the traffic target object, or the processing unit 1101 is configured to determine the first traffic information of the traffic target object and the traffic application type based on a received traffic application request of the traffic target object, where the traffic application request includes the first traffic information of the traffic target object and a request type, and the request type is used to indicate the traffic application type.

In a possible design, the transceiver unit 1102 is configured to receive the traffic application type and the first traffic information of the traffic target object that are sent by a third traffic control unit.

The processing unit 1101 is configured to determine that the third traffic control unit is different from the second traffic control unit, and the transceiver unit 1102 is configured to send the traffic application type and the first traffic information of the traffic target object to the second traffic control unit.

In a possible design, after the transceiver unit 1102 sends the traffic application type and the first traffic information of the traffic target object to the second traffic control unit, the transceiver unit 1102 is configured to receive a first message sent by the second traffic control unit, where the first message is used to indicate that the second traffic control unit determines to receive the traffic application type and the first traffic information of the traffic target object.

In a possible design, the traffic information processing apparatus is a local traffic control unit or a global traffic control unit, and a management area of the global traffic control unit includes a management area of at least one local traffic control unit.

In a possible design, the traffic information processing apparatus is a local traffic control unit, the processing unit 1101 is configured to determine the first traffic control unit based on the interaction coverage area and the management area of the traffic control unit known to the first traffic control unit, where there is an overlapping area between a management area of the first traffic control unit and the interaction coverage area, the processing unit 1101 is configured to determine a traffic participant in the overlapping area between the management area of the traffic information processing apparatus and the interaction coverage area, and the transceiver unit 1102 is configured to send the first traffic information of the traffic target object to the traffic participant, or the transceiver unit 1102 is configured to receive second traffic information sent by the traffic participant, and send the second traffic information to the traffic target object.

In a possible design, the traffic participant is a communication object in the overlapping area between the management area of the first traffic control unit and the interaction coverage area within a preset time.

In a possible design, after the transceiver unit 1102 sends the first traffic information of the traffic target object to the traffic participant, the transceiver unit 1102 is configured to receive a second message sent by the traffic participant, where the second message is used to indicate that the traffic participant determines to receive the first traffic information of the traffic target object.

In a possible design, after the transceiver unit 1102 receives the second traffic information sent by the traffic participant, the transceiver unit 1102 is configured to send a third message to the traffic participant, where the third message is used to indicate that the first traffic control unit determines to receive the second traffic information sent by the traffic participant.

Figure 12:
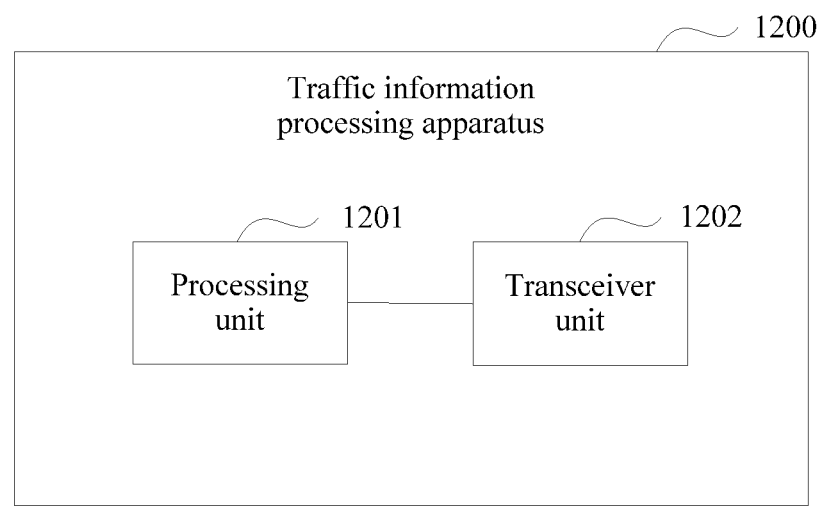
FIG. 12 is a second schematic structural diagram of a traffic information processing apparatus according to this application.

Based on the foregoing embodiment, referring to FIG. 12, this application provides a traffic information processing apparatus 1200 configured to implement the method shown in FIG. 7. The apparatus 1200 includes a processing unit 1201 configured to obtain a traffic application type and first traffic information of a traffic target object, where the traffic application type is used to indicate a to-be-processed traffic scenario, and determine an interaction coverage area based on the traffic application type and the first traffic information of the traffic target object, where the interaction coverage area is used to indicate a geographic area related to the to-be-processed traffic scenario, and a transceiver unit 1202 configured to if the processing unit 1201 determines that there is an overlapping area between the interaction coverage area and a management area of a traffic control unit other than the first traffic control unit, send the traffic application type and the first traffic information of the traffic target object to the second traffic control unit, where the traffic information processing apparatus knows a management area of the traffic information processing apparatus, and the second traffic control unit knows a management area of each traffic control unit.

In a possible design, the traffic information processing apparatus is a local traffic control unit, and the second traffic control unit is a global traffic control unit.

In a possible design, the processing unit 1201 is configured to obtain the first traffic information of the traffic target object and the traffic application type based on a preset condition, or the transceiver unit 1202 is configured to receive the first traffic information of the traffic target object, and the processing unit 1201 is configured to determine the traffic application type based on the first traffic information of the traffic target object, or the processing unit 1201 is configured to determine the first traffic information of the traffic target object and the traffic application type based on a received traffic application request of the traffic target object, where the traffic application request includes the first traffic information of the traffic target object and a request type, and the request type is used to indicate the traffic application type.

In a possible design, the transceiver unit 1202 is configured to receive the traffic application type and the first traffic information of the traffic target object that are sent by a third traffic control unit, and the processing unit 1201 is configured to determine that the third traffic control unit is different from the second traffic control unit, and the transceiver unit 1202 is configured to send the traffic application type and the first traffic information of the traffic target object to the second traffic control unit.

In a possible design, after the transceiver unit 1202 sends the traffic application type and the first traffic information of the traffic target object to the second traffic control unit, the transceiver unit 1202 is configured to receive a first message sent by the second traffic control unit, where the first message is used to indicate that the second traffic control unit determines to receive the traffic application type and the first traffic information of the traffic target object.

Figure 13:
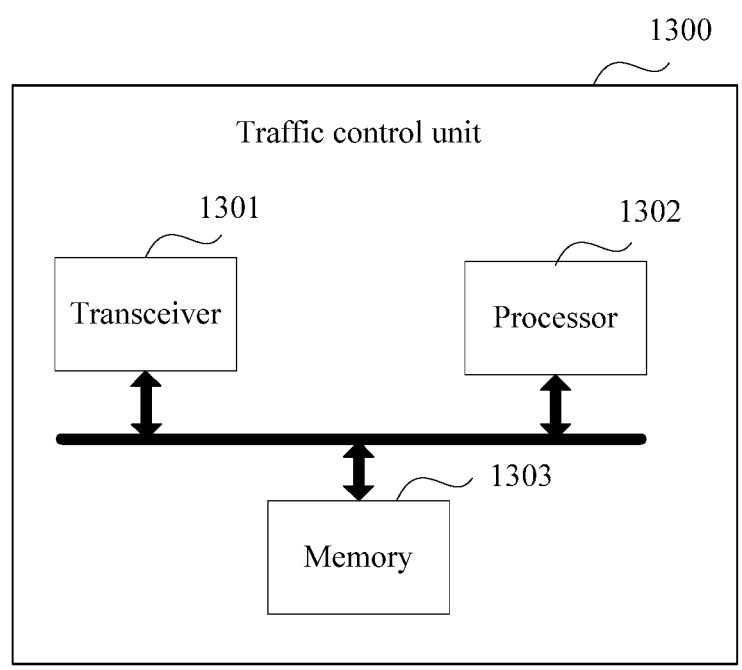
FIG. 13 is a schematic structural diagram of a traffic control unit according to this application.

Based on the foregoing embodiment, referring to FIG. 13, an embodiment of this application further provides a traffic control unit 1300. The traffic control unit 1300 includes a transceiver 1301, a processor 1302, and a memory 1303. A function of the transceiver unit in each of FIG. 11 and FIG. 12 is implemented using the transceiver 1301, and a function of the processing unit is implemented using the processor 1302.

The memory 1303 is configured to store a program, an instruction, and the like. Further, the program may include program code, and the program code includes a computer operation instruction. The memory 1303 may include a random access memory (RAM) and the like, and may further include a nonvolatile memory, for example, at least one disk memory. The processor 1302 may be a central processing unit (CPU), a network processor (NP), a hardware chip, or any combination thereof. The processor 1302 executes the application program stored in the memory 1303 to implement the foregoing function in order to implement the method shown in FIG. 5 or FIG. 7.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. In addition, the embodiments of this application may use a form of a computer program product that is implemented on one or more computer-usable storage media (including but not limited to a disk memory, a compact disc ROM (CD-ROM), an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of another programmable data processing device to generate a machine such that the instructions executed by the computer or the processor of the other programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of this application. In this way, this application is intended to cover these modifications and variations made to the embodiments of this application provided that they fall within the scope of protection defined by the following claims of this application and their equivalent technologies.

What is claimed is:

1. A traffic information processing method, implemented by a first traffic control unit, wherein the traffic information processing method comprises:
    obtaining a traffic application type and first traffic information of a traffic target object, wherein the traffic application type indicates a to-be-processed traffic scenario;
    determining an interaction coverage area based on the traffic application type and the first traffic information, wherein the interaction coverage area indicates a geographic area related to the to-be-processed traffic scenario;
    determining a second traffic control unit based on the interaction coverage area and a management area of the second traffic control unit, wherein there is an overlapping area between a management area of the second traffic control unit and the interaction coverage area, and wherein the second traffic control unit is different from the first traffic control unit; and
    sending the first traffic information to the second traffic control unit.

2. The traffic information processing method of claim 1, further comprising one of:
    obtaining the first traffic information and the traffic application type based on a preset instruction;

receiving the first traffic information and determining the traffic application type based on the first traffic information; or determining the first traffic information and the traffic application type based on a received traffic application request, wherein the traffic application request comprises the first traffic information and a request type, and the request type is used to indicate the traffic application type.

3. The traffic information processing method of claim 1, further comprising:

sending the first traffic information to the second traffic control unit when determining that a third traffic control unit is different from the second traffic control unit; and receiving the first traffic information of the traffic object from the third traffic control unit.

4. The traffic information processing method of claim 1, wherein the first traffic control unit is a local traffic control unit, and wherein the traffic information processing method further comprises:

determining the second traffic control unit based on the interaction coverage area and the management area of the second traffic control unit, wherein there is an overlapping area between a management area of the first traffic control unit and the interaction coverage area, determining a traffic participant in the overlapping area between the management area of the first traffic control unit and the interaction coverage area, and sending the first traffic information to the traffic participant; or receiving second traffic information from the traffic participant, and sending the second traffic information to the traffic target object.

5. The traffic information processing method of claim 4, wherein the traffic participant is a communication object in the overlapping area between the management area of the first traffic control unit and the interaction coverage area within a preset time.

6. A traffic information processing method, implemented by a first traffic control unit, wherein the traffic information processing method comprises:

obtaining a traffic application type and first traffic information of a traffic target object, wherein the traffic application type indicates a to-be-processed traffic scenario;

determining an interaction coverage area based on the traffic application type and the first traffic information, wherein the interaction coverage area indicates a geographic area related to the to-be-processed traffic scenario; and sending the first traffic information to a second traffic control unit when determining that there is an overlapping area between the interaction coverage area and a management area other than the first traffic control unit, wherein the first traffic control unit comprises a management area of the first traffic control unit and the second traffic control unit comprises a management area of each traffic control unit.

7. The traffic information processing method of claim 6, wherein the first traffic control unit is a local traffic control unit, and wherein the second traffic control unit is a global traffic control unit.

8. The traffic information processing method of claim 6, further comprising one of:

obtaining the first traffic information and the traffic application type based on a preset instruction;

receiving the first traffic information and determining the traffic application type based on the first traffic information; or determining the first traffic information and the traffic application type based on a received traffic application request, wherein the traffic application request comprises the first traffic information and a request type, and wherein the request type indicates the traffic application type.

9. The traffic information processing method of claim 6, further comprising:

sending the first traffic information to the second traffic control unit when determining that a third traffic control unit is different from the second traffic control unit; and receiving the first traffic information from the third traffic control unit.

10. A traffic information processing apparatus, comprising:

a processor configured to:

obtain a traffic application type and first traffic information of a traffic target object, wherein the traffic application type indicates a to-be-processed traffic scenario;

determine an interaction coverage area based on the traffic application type and the first traffic information, wherein the interaction coverage area indicates a geographic area related to the to-be-processed traffic scenario; and determine a second traffic control unit based on the interaction coverage area and a management area of the second traffic control unit known to a first traffic control unit, wherein there is an overlapping area between a management area of the second traffic control unit and the interaction coverage area, and the second traffic control unit is different from the first traffic control unit; and a transceiver, coupled to the processor, and configured to send the first traffic information to the second traffic control unit.

11. The traffic information processing apparatus of claim 10, wherein the processor is further configured to:

obtain the first traffic information and the traffic application type based on a preset instruction;

determine the traffic application type based on the first traffic information that is received by the transceiver; or determine the first traffic information and the traffic application type based on a traffic application request that is received by the transceiver, wherein the traffic application request comprises the first traffic information and a request type, and wherein the request type indicates the traffic application type.

12. The traffic information processing apparatus of claim 10, wherein the processor is further configured to determine that a third traffic control unit is different from the second traffic control unit, and wherein the transceiver is further configured to:

send the first traffic information to the second traffic control unit when the third traffic control unit is different from the second traffic control unit; and receive the first traffic information from the third traffic control unit.

13. The traffic information processing apparatus of claim 10, wherein the traffic information processing apparatus is a local traffic control unit, wherein the processor is further configured to:

determine the first traffic control unit based on the interaction coverage area and the management area of the first traffic control unit, wherein there is an overlapping area between a management area of the first traffic control unit and the interaction coverage area; and determine a traffic participant in the overlapping area between the management area of the traffic information processing apparatus and the interaction coverage area, and wherein the transceiver is further configured to either send the first traffic information to the traffic participant, or receive second traffic information from the traffic participant and send the second traffic information to the traffic target object.

14. The traffic information processing apparatus of claim 13, wherein the traffic participant is a communication object in the overlapping area between the management area of the first traffic control unit and the interaction coverage area within a preset time.

15. A traffic information processing apparatus, comprising:
  a memory comprising instructions;
  a processor coupled to the memory and configured to execute the instructions that cause the processor to:
    obtain a traffic application type and first traffic information of a traffic target object, wherein the traffic application type indicates a to-be-processed traffic scenario;
    determine an interaction coverage area based on the traffic application type and the first traffic information, wherein the interaction coverage area indicates a geographic area related to the to-be-processed traffic scenario; and
    determine an overlapping area between the interaction coverage area and a management area of a traffic control unit other than a first traffic control unit; and
  a transceiver, coupled to the processor, and configured to send the first traffic information to a second traffic control unit when the processor determines that there is the overlapping area between the interaction coverage area and the management area of the traffic control unit other than the first traffic control unit, wherein the traffic information processing apparatus comprises a management area of the traffic information processing apparatus, and wherein the second traffic control unit comprises a management area of each traffic control unit.

16. The traffic information processing apparatus of claim 15, wherein the traffic information processing apparatus is a local traffic control unit, wherein the second traffic control unit is a global traffic control unit.

17. The traffic information processing apparatus of claim 15, wherein the processor is further configured to:
  obtain the first traffic information and the traffic application type based on a preset instruction;
  determine the traffic application type based on the first traffic information that is received by the transceiver; or
  determine the first traffic information and the traffic application type based on a received traffic application request, wherein the traffic application request comprises the first traffic information and a request type, and wherein the request type indicates the traffic application type.

18. The traffic information processing apparatus of claim 15, wherein the processor is further configured to determine that a third traffic control unit is different from the second traffic control unit, and wherein the transceiver is further configured to send the first traffic information to the second traffic control unit when the third traffic control unit is different from the second traffic control unit, and wherein the traffic information processing apparatus receives the first traffic information from the third traffic control unit.

19. A computer program product comprising computer-executable instructions stored on a non-transitory computer-readable medium that, when executed by a processor, cause a traffic information processing apparatus to:
  obtain a traffic application type and first traffic information of a traffic target object, wherein the traffic application type indicates a to-be-processed traffic scenario;
  determine an interaction coverage area based on the traffic application type and the first traffic information, wherein the interaction coverage area indicates a geographic area related to the to-be-processed traffic scenario;
  determine a second traffic control unit based on the interaction coverage area and a management area of a traffic control unit known to a first traffic control unit, wherein there is an overlapping area between a management area of the second traffic control unit and the interaction coverage area, wherein the second traffic control unit is different from the first traffic control unit; and
  send the first traffic information of the traffic target object to the second traffic control unit.

20. A computer program product comprising computer-executable instructions stored on a non-transitory computer-readable medium that, when executed by a processor, cause a traffic information processing apparatus to:
  obtain a traffic application type and first traffic information of a traffic target object, wherein the traffic application type indicates a to-be-processed traffic scenario;
  determine an interaction coverage area based on the traffic application type and the first traffic information, wherein the interaction coverage area indicates a geographic area related to the to-be-processed traffic scenario;
  determine an overlapping area between the interaction coverage area and a management area of a traffic control unit other than a first traffic control unit; and
  send the first traffic information to a second traffic control unit when there is the overlapping area between the interaction coverage area and the management area of the traffic control unit other than the first traffic control unit, wherein the first traffic control unit comprises a management area of the first traffic control unit and the second traffic control unit comprises a management area of each traffic control unit.

* * * * *